United States Patent
Tsuruoka

(10) Patent No.: US 8,081,236 B2
(45) Date of Patent: Dec. 20, 2011

(54) CAMERA SYSTEM CAPABLE OF PERFORMING EXPOSURE CONTROL PROCESSING COMBINED WITH GRADATION CONVERSION PROCESSING

(75) Inventor: Takao Tsuruoka, Machida (JP)

(73) Assignee: Olympus Corporation, Tokyo (JP)

( * ) Notice: Subject to any disclaimer, the term of this patent is extended or adjusted under 35 U.S.C. 154(b) by 528 days.

(21) Appl. No.: 12/130,052

(22) Filed: May 30, 2008

(65) Prior Publication Data

US 2008/0231730 A1   Sep. 25, 2008

Related U.S. Application Data

(63) Continuation of application No. PCT/JP2006/323123, filed on Nov. 20, 2006.

(30) Foreign Application Priority Data

Dec. 1, 2005 (JP) .................................. 2005-348391

(51) Int. Cl.
H04N 5/235 (2006.01)

(52) U.S. Cl. .................................. 348/229.1; 348/221.1

(58) Field of Classification Search .......................... None
See application file for complete search history.

(56) References Cited

U.S. PATENT DOCUMENTS

| | | | |
|---|---|---|---|
| 2002/0036697 A1* | 3/2002 | Mori et al. | 348/229 |
| 2002/0154829 A1 | 10/2002 | Tsukioka | |
| 2003/0095192 A1 | 5/2003 | Horiuchi | |
| 2004/0085459 A1* | 5/2004 | Hoshuyama et al. | 348/223.1 |
| 2005/0190272 A1* | 9/2005 | Takahashi et al. | 348/222.1 |
| 2006/0221217 A1* | 10/2006 | Kubo et al. | 348/262 |
| 2006/0227227 A1 | 10/2006 | Tsuruoka | |
| 2009/0009632 A1* | 1/2009 | Hyodo et al. | 348/234 |

FOREIGN PATENT DOCUMENTS

| | | |
|---|---|---|
| EP | 1 202 563 A1 | 5/2002 |
| JP | 2001-054014 | 2/2001 |
| JP | 2002-135648 | 5/2002 |
| JP | 2002-223387 | 8/2002 |
| JP | 2002-232777 | 8/2002 |
| JP | 2002-271686 | 9/2002 |
| JP | 2003-060980 | 2/2003 |
| JP | 2003-069821 | 3/2003 |
| JP | 3465226 | 11/2003 |
| JP | 2004-088149 | 3/2004 |
| JP | 2005-175718 | 6/2005 |

(Continued)

Primary Examiner — Luong T Nguyen
(74) Attorney, Agent, or Firm — Volpe and Koenig, P.C.

(57) ABSTRACT

A camera system is provided, which performs exposure amount control operation in combination with gradation conversion processing for an image signal acquired from a CCD. With such a camera system, a control unit performs control operation so as to perform pre-shooting multiple times with different exposure amounts prior to real shooting. A conversion property calculation unit calculates conversion properties with respect to the image signals acquired in the pre-shooting, which are to be used in the gradation conversion processing. An exposure control unit determines an exposure amount used in the real shooting based upon the image signals acquired in the pre-shooting, the exposure amounts used in the pre-shooting, and the conversion properties. The control unit performs control operation so as to perform the real shooting based upon the determined exposure amount. A gradation conversion unit performs gradation conversion processing on the image signals obtained in the real shooting.

19 Claims, 12 Drawing Sheets

FOREIGN PATENT DOCUMENTS

| | | |
|---|---|---|
| JP | 2005-191711 | 7/2005 |
| JP | 2005-294921 | 10/2005 |
| JP | 2006-295581 | 10/2006 |
| JP | 2006-295774 | 10/2006 |
| WO | 2005/081543 | 9/2005 |

* cited by examiner

FIG.12

| $R_{00}$ | $G_{10}$ | $R_{20}$ | $G_{30}$ | $R_{40}$ | $G_{50}$ |
|---|---|---|---|---|---|
| $G_{01}$ | $B_{11}$ | $G_{21}$ | $B_{31}$ | $G_{41}$ | $B_{51}$ |
| $R_{02}$ | $G_{12}$ | $R_{22}$ | $G_{32}$ | $R_{42}$ | $G_{52}$ |
| $G_{03}$ | $B_{13}$ | $G_{23}$ | $B_{33}$ | $G_{43}$ | $B_{53}$ |
| $R_{04}$ | $G_{14}$ | $R_{24}$ | $G_{34}$ | $R_{44}$ | $G_{54}$ |
| $G_{05}$ | $B_{15}$ | $G_{25}$ | $B_{35}$ | $G_{45}$ | $B_{55}$ |

FIG.13

| $Cy_{00}$ | $Ye_{10}$ | $Cy_{20}$ | $Ye_{30}$ | $Cy_{40}$ | $Ye_{50}$ |
|---|---|---|---|---|---|
| $G_{01}$ | $Mg_{11}$ | $G_{21}$ | $Mg_{31}$ | $G_{41}$ | $Mg_{51}$ |
| $Cy_{02}$ | $Ye_{12}$ | $Cy_{22}$ | $Ye_{32}$ | $Cy_{42}$ | $Ye_{52}$ |
| $Mg_{03}$ | $G_{13}$ | $Mg_{23}$ | $G_{33}$ | $Mg_{43}$ | $G_{53}$ |
| $Cy_{04}$ | $Ye_{14}$ | $Cy_{24}$ | $Ye_{34}$ | $Cy_{44}$ | $Ye_{54}$ |
| $G_{05}$ | $Mg_{15}$ | $G_{25}$ | $Mg_{35}$ | $G_{45}$ | $Mg_{55}$ |

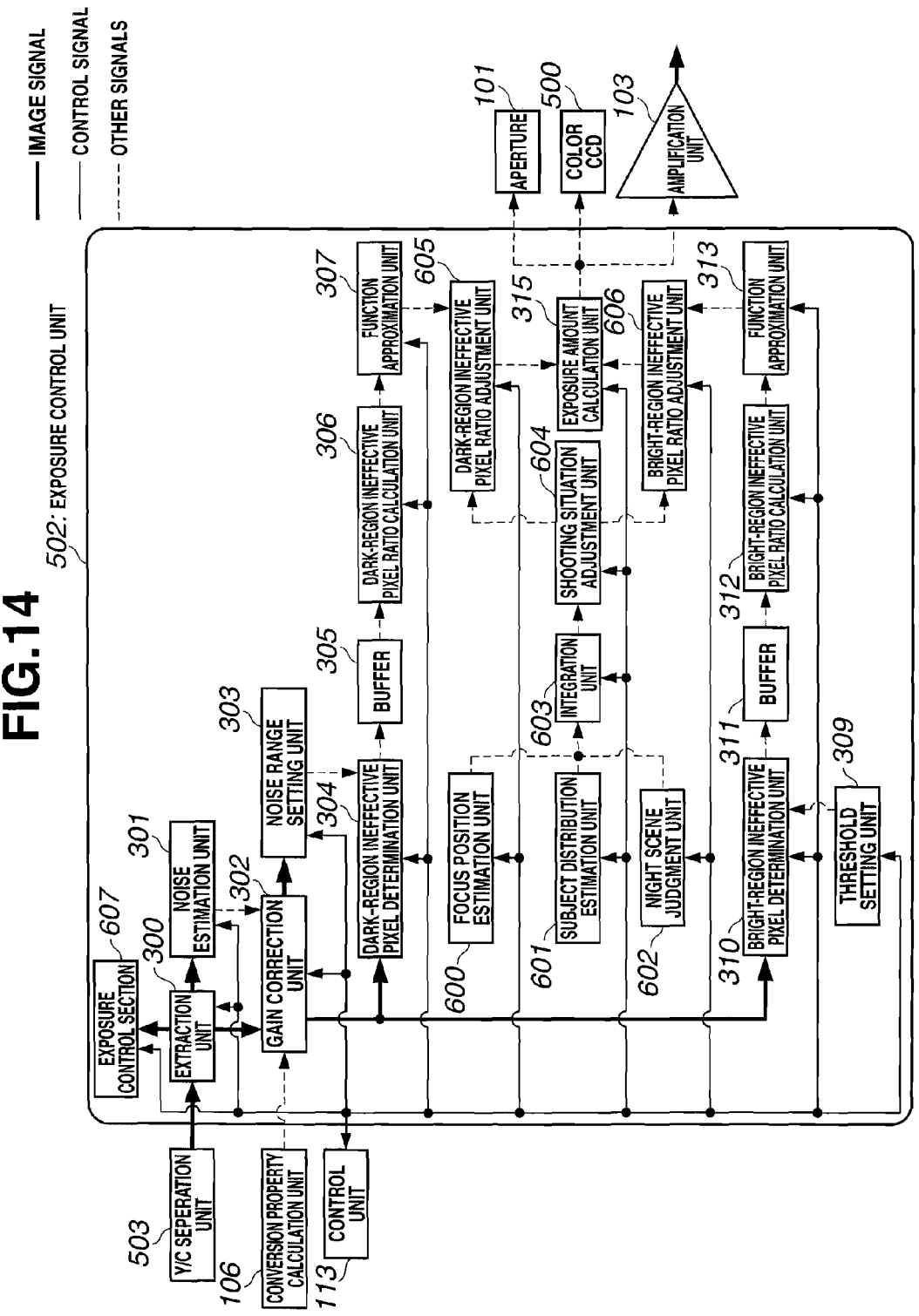

FIG.15

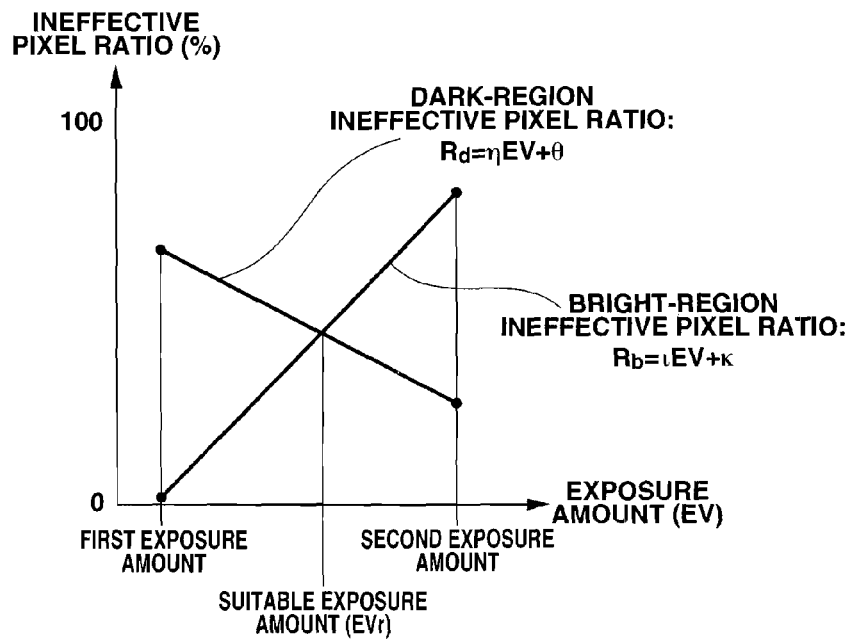

FIG.16

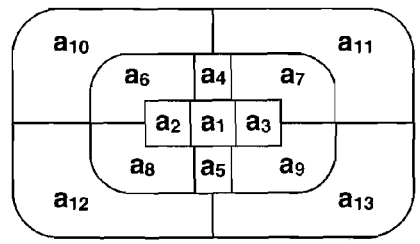

FIG.17

| AF INFORMATION | AE INFORMATION | SHOOTING SITUATION | CONTENT OF CORRECTION |
|---|---|---|---|
| 5m ~ ∞ | $S_3 > Th_1$ | SCENE INCLUDING SKY IN UPPER REGION | BRIGHT-REGION INEFFECTIVE PIXEL RATIO: +20% |
| | $S_3 \leq Th_1$ | SCENE INCLUDING NO (LITTLE) SKY IN UPPER REGION | BRIGHT-REGION INEFFECTIVE PIXEL RATIO: +10% |
| 1m ~ 5m | $S_2 > Th_2$ | PORTRAIT OF SINGLE HUMAN BEING | DARK-REGION INEFFECTIVE PIXEL RATIO: +20% |
| | $S_2 \leq Th_2$ | PORTRAIT OF MULTIPLE HUMAN BEINGS | DARK-REGION INEFFECTIVE PIXEL RATIO: +10% |
| 1m OR LESS | $S_1 > Th_3$ | CLOSEUP OF MULTIPLE SUBJECTS | BRIGHT-REGION INEFFECTIVE PIXEL RATIO: +5% |
| | $S_1 \leq Th_3$ | CLOSEUP OF SINGLE SUBJECT | DARK-REGION INEFFECTIVE PIXEL RATIO: +5% |
| - | - | NIGHT SCENE | DARK-REGION INEFFECTIVE PIXEL RATIO: +30% |

US 8,081,236 B2

CAMERA SYSTEM CAPABLE OF PERFORMING EXPOSURE CONTROL PROCESSING COMBINED WITH GRADATION CONVERSION PROCESSING

CROSS REFERENCE TO RELATED APPLICATION

This application is a continuation application of PCT/JP2006/323123 filed on Nov. 20, 2006 and claims benefit of Japanese Application No. 2005-348391 filed in Japan on Dec. 1, 2005, the entire contents of which are incorporated herein by this reference.

TECHNICAL FIELD

The present invention relates to a camera system having a function of performing exposure control processing combined with gradation conversion processing for an image signal acquired by an image pickup device.

BACKGROUND ART

Conventional camera systems are known having a function of performing exposure control operation based upon exposure measurement results obtained from metering mode mainly at a centerweighted metering, an evaluative metering, a multi-segment metering, etc.

For example, a technique is described in Japanese Unexamined Patent Application Publication No. 2001-54014, which combines the multi-segment metering and the adjustment of the gradation conversion properties. Such an arrangement provides suitable exposure for the principal subject, and provides an image signal with a suitable gradation representation.

Also, a technique is known in which independent gradation conversion processing is performed in increment of divided regions, which is generally referred to as "space-variant gradation conversion processing". Examples of such techniques include a technique disclosed in Japanese Patent Application No. 3465226. A technique is described in this Application publication, which divides a image signal into multiple regions based upon texture information, and a gradation conversion curve is obtained for each region based upon a histogram so as to perform gradation conversion processing. With such an arrangement, gradation conversion processing is performed such that the background region is displayed with suitable exposure as well as the principal subject, thereby providing a high-quality image signal.

Also, a technique is known, which acquires the subject information as it is in a wide dynamic range by performing shooting multiple times under different exposure conditions. As an example of such techniques, a technique is described in Japanese Unexamined Patent Application Publication No. 2002-223387, which controls shooting conditions of shooting performed multiple times under different exposure conditions based upon the information acquired from pre-shooting which is performed beforehand prior to the real shooting. Such an arrangement allows suitable exposure conditions to be set for the subjects having various kinds of dynamic ranges, thereby acquiring information with respect to the subjects without redundancy.

Also, a technique is described in Japanese Unexamined Patent Application Publication No. 2005-175718, which dynamically estimates the noise amount with respect to the luminance signal and the noise amount with respect to the color difference signal so as to perform high-quality noise reduction processing.

The aforementioned technique described in Japanese Unexamined Patent Application Publication No. 2001-54014 provides suitable exposure and suitable gradation representation with respect to the principal subject. However, with such a technique, the other region, i.e., the background region is displayed under an exposure condition according to the principal subject, leading to a problem in that such a technique does not ensure suitable exposure control operation for the background region.

Also, with the aforementioned technique described in Japanese Patent Application No. 3465226, gradation conversion processing is performed for the regions effectively acquired in the shooting, thereby providing high-quality image signals with respect to such regions. However, with such a technique, "whiteout" regions in bright regions and "blackout" regions in dark regions, where the data cannot be acquired in the shooting, cannot be corrected, which is a problem.

Also, with the aforementioned technique described in Japanese Unexamined Patent Application Publication No. 2002-223387, shooting is performed under an exposure condition suitable for the dynamic range of the subject. However, with such a technique, optimum exposure control operation is not performed giving consideration to the subsequent gradation conversion processing and the effect of the noise in a dark region.

Also, with the aforementioned technique described in Japanese Unexamined Patent Application Publication No. 2005-175718, the noise reduction processing, the gradation conversion processing, and the exposure control processing are performed independently, failing to perform optimal cooperation of such a processings.

The present invention has been made in view of the aforementioned situation. Accordingly, it is an object of the present invention to provide a camera system which acquire the overall dynamic range suitable for both the principal subject and the background region, thereby providing a high-quality image signal effectively using the dynamic range of a scene.

Furthermore, it is another object of the present invention to provide a camera system which provide a subjectively preferable image signal giving consideration to "whiteout" in a bright region and the effect of the noise in a dark region.

DISCLOSURE OF INVENTION

Means for Solving the Problem

In order to achieve the aforementioned objects, a camera system according to an aspect of the present invention, which performs exposure amount control operation in combination with gradation conversion processing for an image signal acquired from an image pickup device, comprises: a pre-shooting control unit which performs control operation so as to perform pre-shooting multiple times with different exposure amounts prior to real shooting; a conversion property calculation unit which calculates conversion properties with respect to signals that correspond to the image signals acquired in the pre-shooting, which are to be used in the gradation conversion processing; an exposure control unit which determines an exposure amount used in the real shooting based upon the signals that correspond to the image signals thus acquired in the pre-shooting, the exposure amounts used in the pre-shooting, and the conversion properties; a real shooting control unit which performs control operation so as to perform the real shooting based upon the determined exposure amount; and a gradation conversion unit which calculates conversion properties with respect to the signals that correspond to the image signals obtained in the real shooting, which are to be used in the gradation conversion processing, and performs the gradation conversion processing.

BRIEF DESCRIPTION OF THE DRAWINGS

FIG. 12 is a diagram which shows a pattern of a Bayer-type primary color filter according to the embodiment 2.

FIG. 13 is a diagram which show a pattern of a color-difference line-sequential complementary color filter according to the embodiment 2.

FIG. 14 is a block diagram which shows a configuration of an exposure amount control unit according to the embodiment 2.

FIG. 15 is a line graph which shows the relation between the ineffective pixel ratio in the bright region and the exposure amount, the relation between the ineffective pixel ratio in the dark region and the exposure amount, and the suitable exposure amount according to the embodiment 2.

FIG. 16 is a diagram which shows thirteen areas $a_1$ through $a_{13}$ in the divided exposure control operation according to the embodiment 2.

FIG. 17 is a chart which shows the relation between the estimation of the shooting situation and the image quality adjustment according to the embodiment 2.

BEST MODE FOR CARRYING OUT THE INVENTION

Description will be made below regarding embodiments according to the present invention with reference to the drawings.

Embodiment 1

Figure 1:
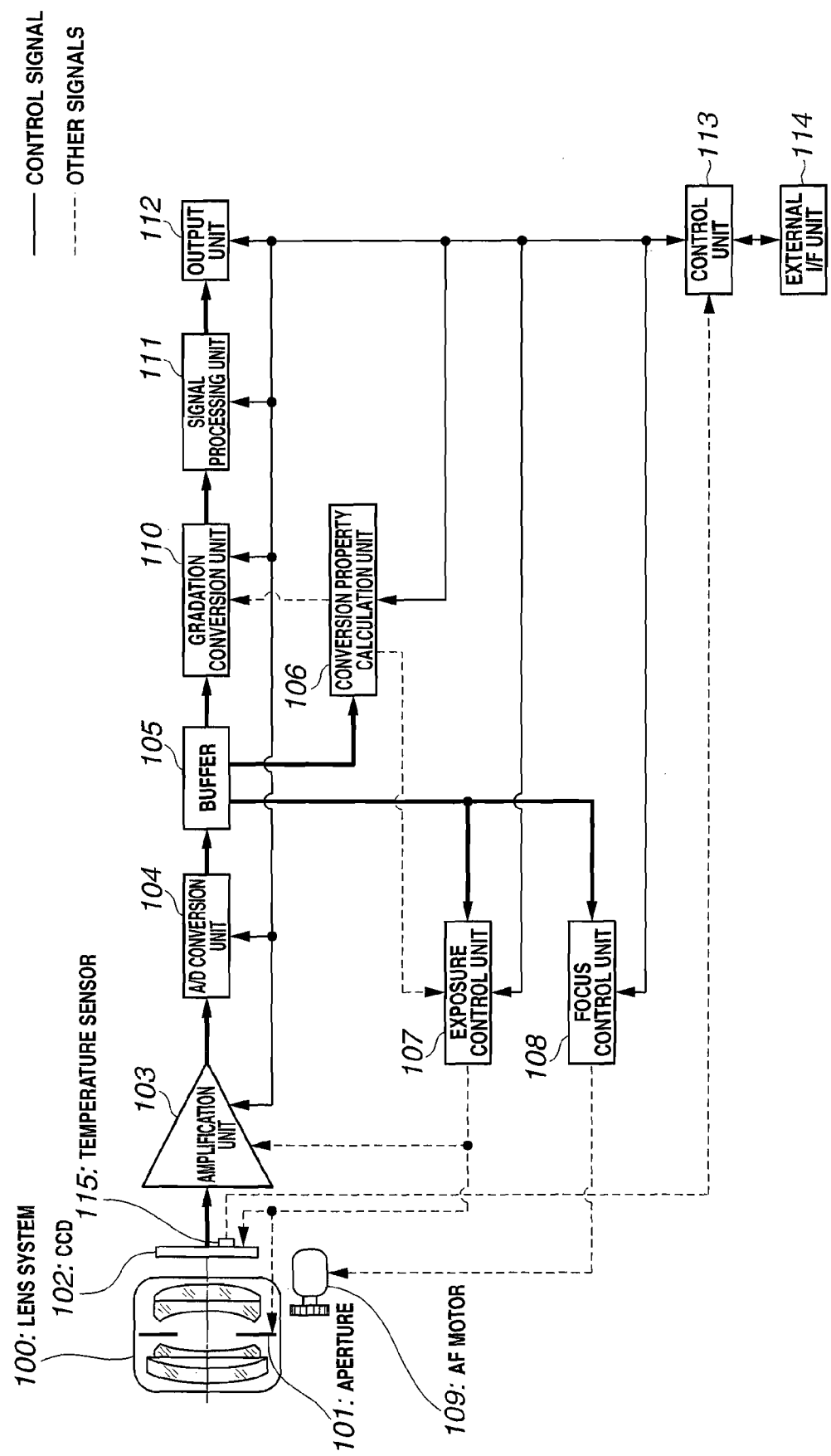
FIG. 1 is a block diagram which shows a configuration of a camera system according to an embodiment of the present invention.
Figure 2:
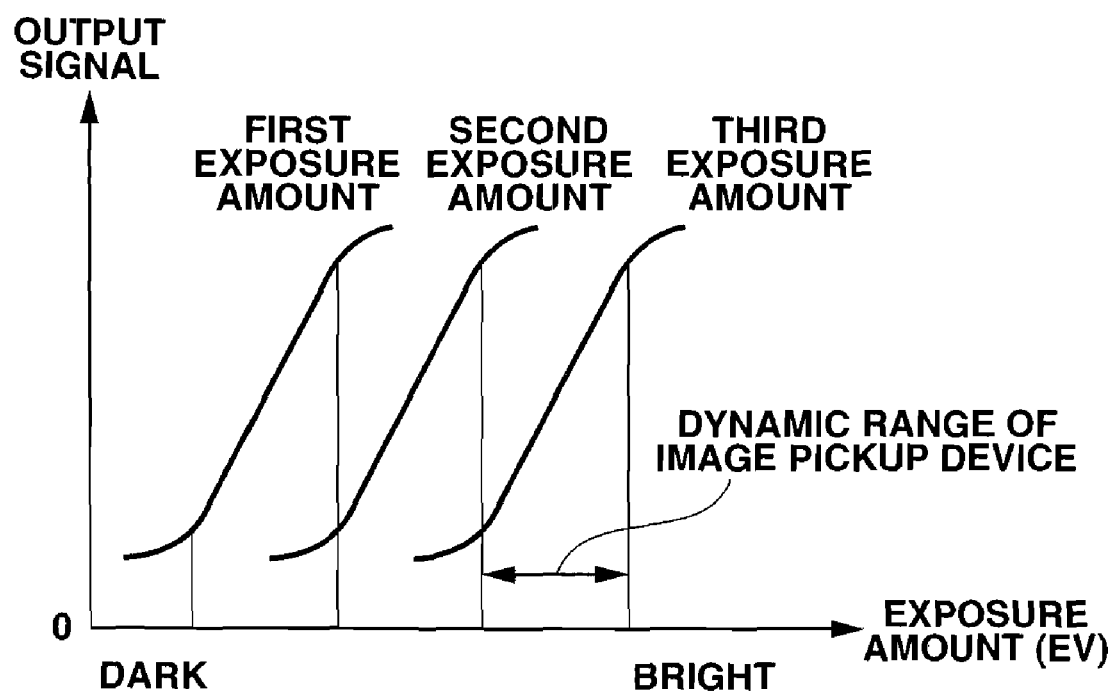
FIG. 2 is a line graph which shows three kinds of exposure amounts used in the pre-shooting mode according to the embodiment 1.
Figure 3:
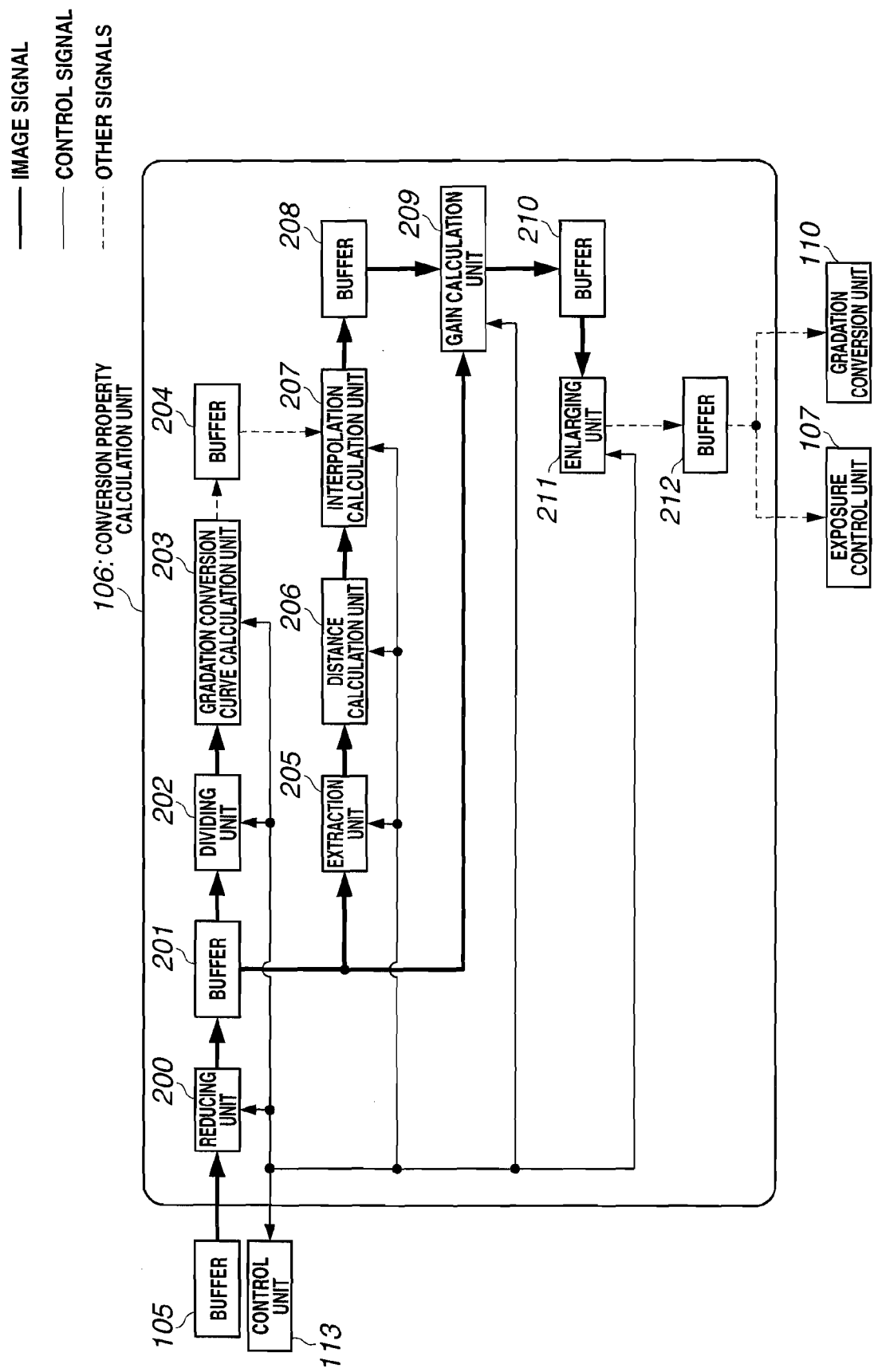
FIG. 3 is a block diagram which shows a configuration of a conversion property calculation unit according to the embodiment 1.
Figure 4:
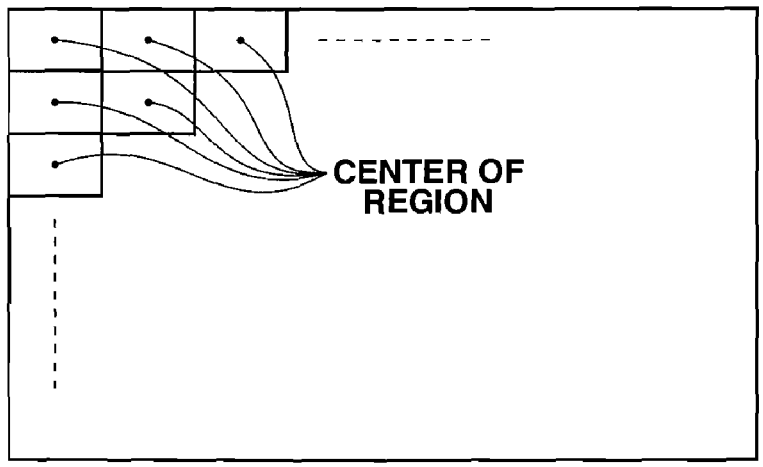
FIG. 4 is a diagram which shows division of a reduced-size signal into regions, which is performed by a dividing unit of a conversion property calculation unit according to the embodiment 1.
Figure 5:
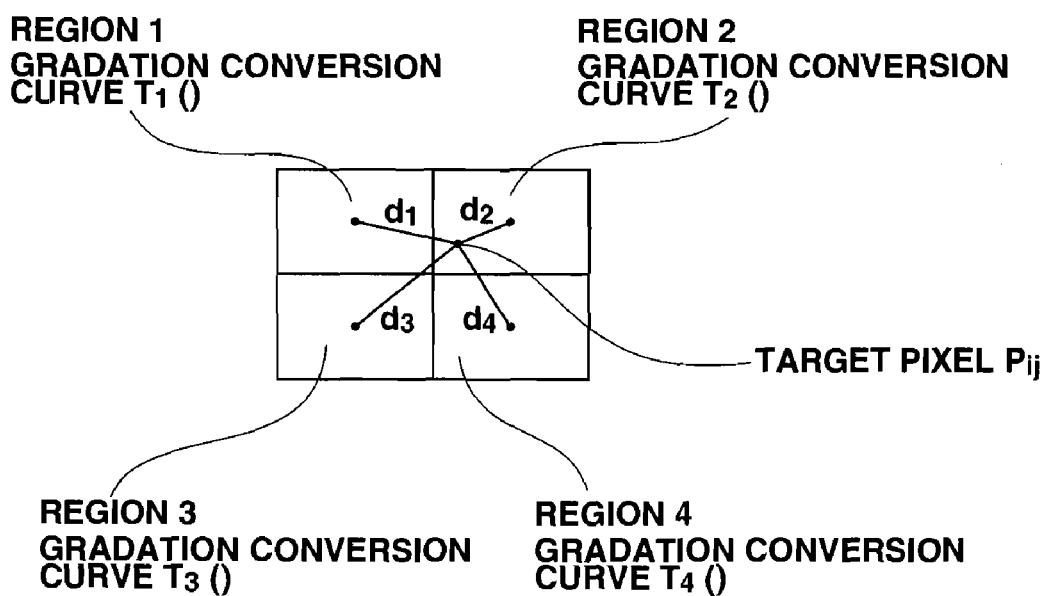
FIG. 5 is a diagram which shows the distances $d_1$ through $d_4$, each of which is the distance between the target pixel and the center of the corresponding one of four regions in the neighborhood of the target pixel, according to the embodiment 1.
Figure 6:
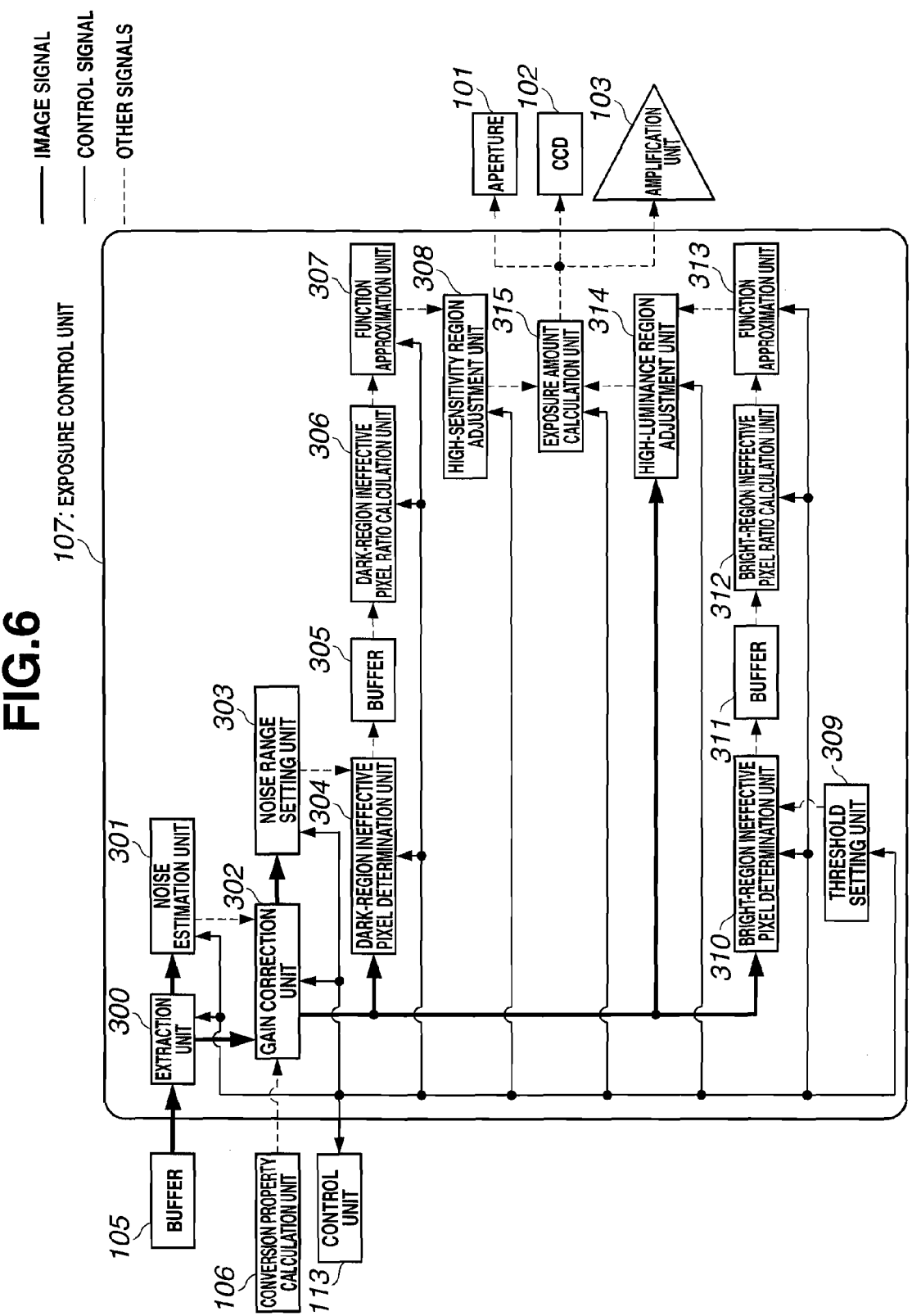
FIG. 6 is a block diagram which shows a configuration of an exposure control unit according to the embodiment 1.
Figure 7:
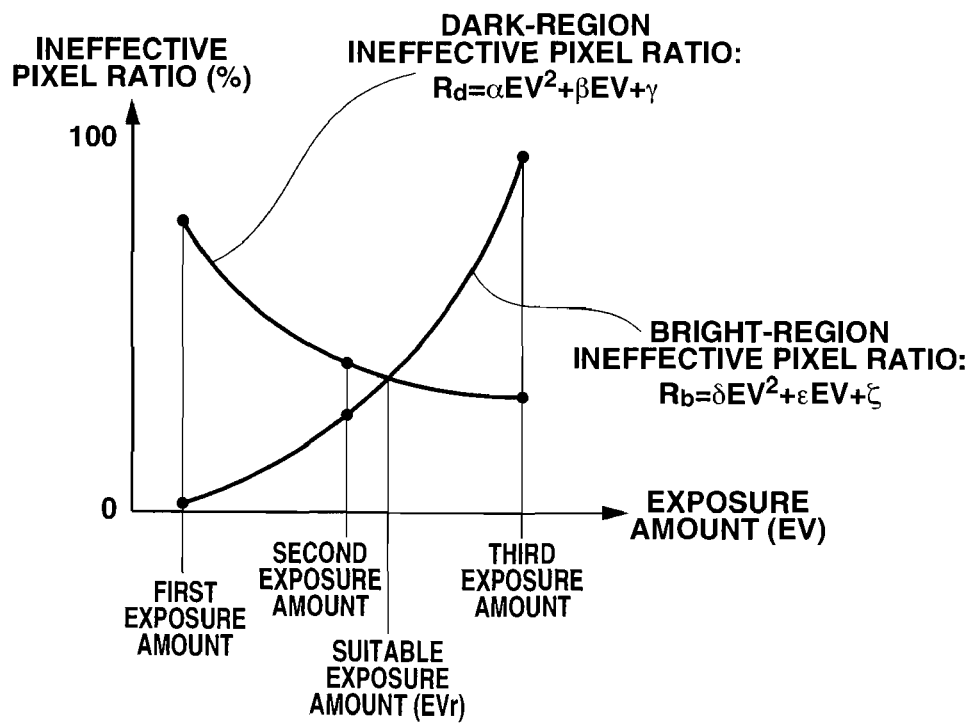
FIG. 7 is a line graph which shows the relation between the ineffective pixel ratio in the bright region and the exposure amount, the relation between the ineffective pixel ratio in the dark region and the exposure amount, and the suitable exposure amount according to the embodiment 1.
Figure 8:
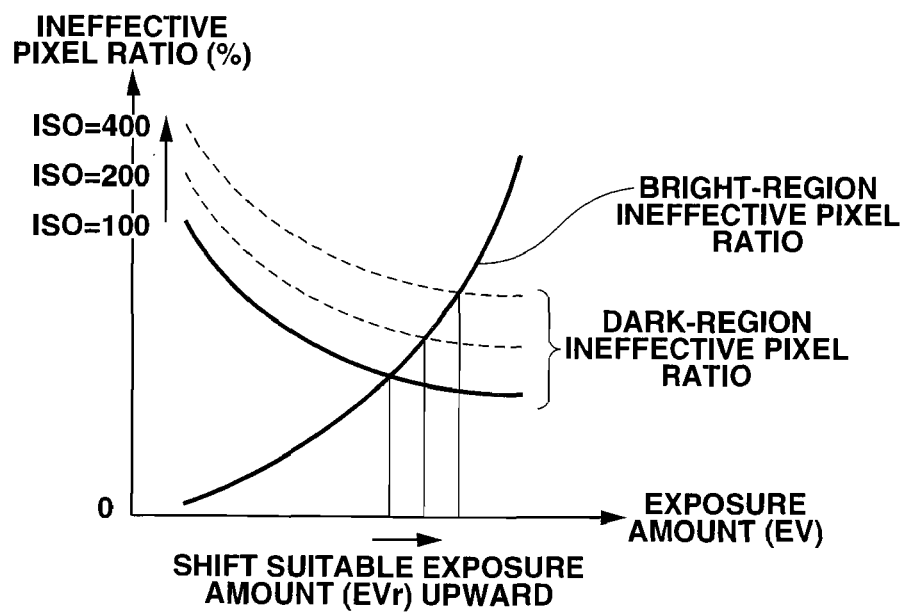
FIG. 8 is a line graph which shows the correction of the dark-region ineffective pixel ratio based upon the ISO sensitivity, which is performed by a high-sensitivity region adjustment unit according to the embodiment 1.
Figure 9:
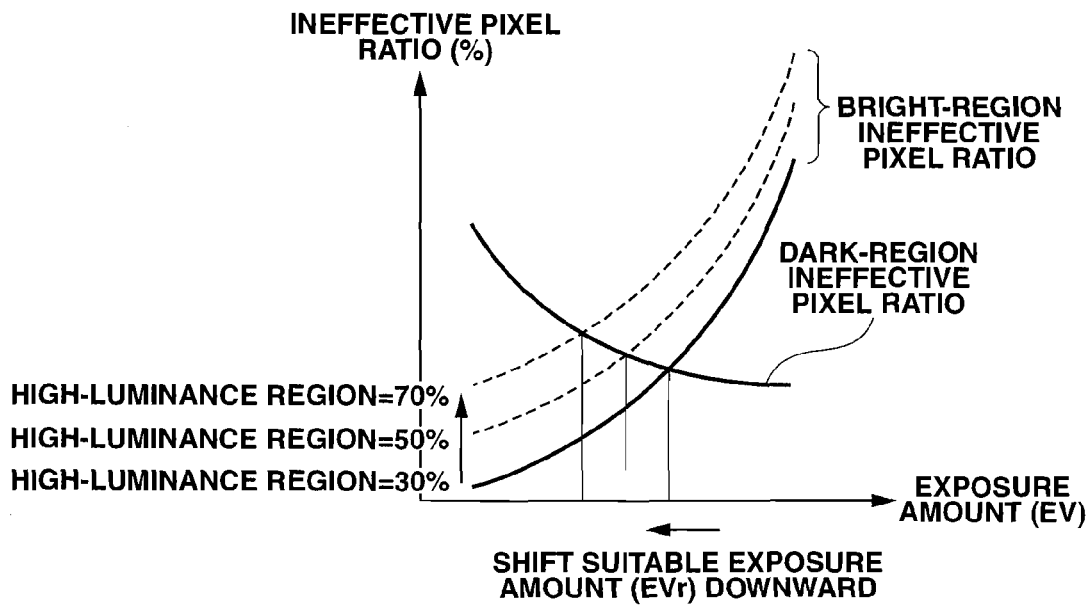
FIG. 9 is a line graph which shows the correction of the bright-region ineffective pixel ratio based upon the high-luminance region area ratio performed by the high-luminance region adjustment unit according to the embodiment 1.
Figure 10:
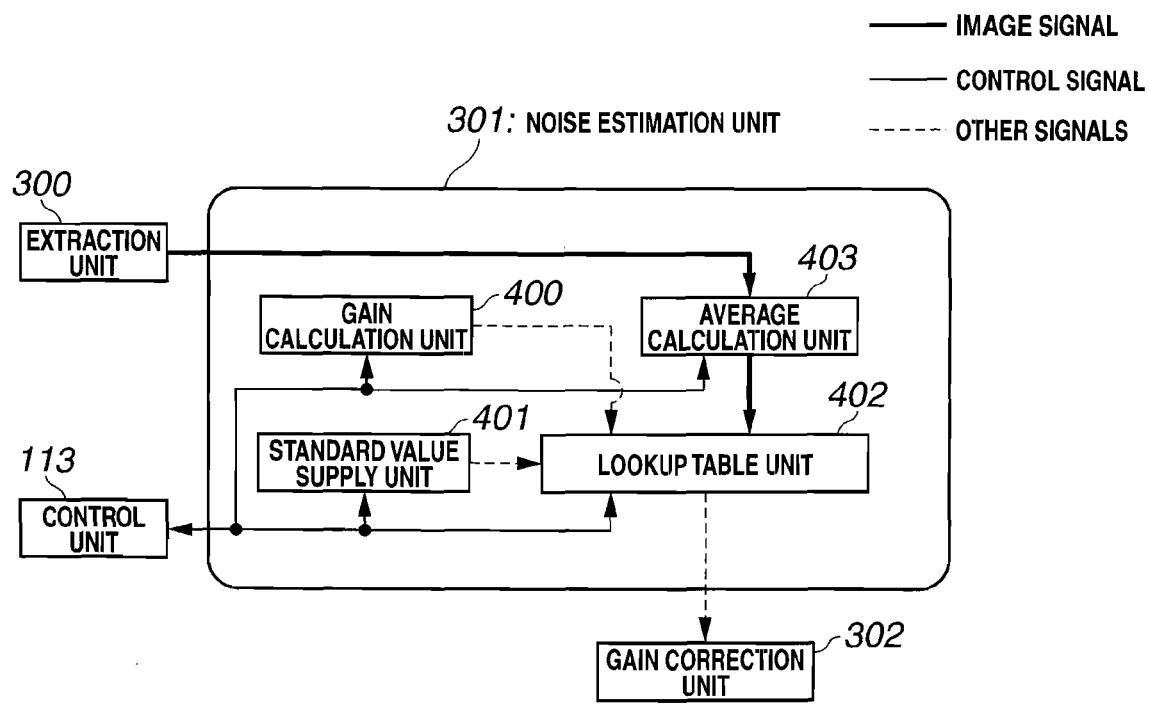
FIG. 10 is a block diagram which shows a configuration of a noise estimation unit according to the embodiment 1.

FIG. 1 through FIG. 10 show an embodiment 1 according to the present invention. FIG. 1 is a block diagram which shows a configuration of a camera system. FIG. 2 is a line graph which shows three kinds of exposure amounts in a pre-shooting mode. FIG. 3 is a block diagram which shows a conversion property calculation unit. FIG. 4 is a diagram for describing division of a reduced-size signal into regions, which is performed by a dividing unit of the conversion property calculation unit. FIG. 5 is a diagram which shows the distances $d_1$ through $d_4$, each of which is the distance between the target pixel and the center of the corresponding one of four regions in the neighborhood of the target pixel. FIG. 6 is a block diagram which shows a configuration of an exposure control unit. FIG. 7 is a line graph which shows the relation between the ineffective pixel ratio in the bright region and the exposure amount, the relation between the ineffective pixel ratio in the dark region and the exposure amount, and the suitable exposure amount. FIG. 8 is a graph for describing the correction of the dark-region ineffective pixel ratio performed by a high-sensitivity region adjustment unit based upon the ISO sensitivity. FIG. 9 is a graph which shows the correction of the bright-region ineffective pixel ratio performed by a high-luminance region adjustment unit based upon the area ratio of the high-luminance region. FIG. 10 is a block diagram which shows a configuration of a noise estimation unit.

First, description will be made regarding a configuration of a camera system with reference to FIG. 1.

The camera system includes a lens system 100, an aperture 101, a CCD 102, an amplification unit 103, an A/D conversion unit 104, a buffer 105, a conversion property calculation unit 106, an exposure control unit 107, a focus control unit 108, an AF motor 109, a gradation conversion unit 110, a signal processing unit 111, an output unit 112, a control unit 113, an external I/F unit 114, and a temperature sensor 115.

The lens system 100 forms an optical image of a subject onto an image pickup surface of the CCD 102.

The aperture 101 defines the range through which the luminous flux of the subject formed by the lens system 100 passes, thereby adjusting the brightness of the optical image formed on the image pickup surface of the CCD 102.

The CCD 102 is an image pickup device which performs photoelectric conversion of the optical image thus formed, and which outputs the image in the form of an analog image signal. It should be noted that description will be made in the present embodiment regarding an arrangement employing a single monochrome CCD as the CCD 102. Here, the image pickup device is not restricted to a CCD, rather, other kinds of image pickup devices such as CMOS sensors or the like may be employed.

The temperature sensor 115 is arranged in the neighborhood of the CCD 102, which substantially measures the temperature of the CCD 112, and outputs the temperature thus measured to the control unit 113.

The amplification unit 103 amplifies the image signal outputted from the CCD 102. The gain of the amplification unit 103 is set by the exposure control unit 107 under the control of the control unit 113.

The A/D conversion unit 104 converts the analog image signal, which is outputted from the CCD 102 and which is amplified by the amplification unit 103, into a digital image signal under the control of the control unit 113.

The buffer 105 temporarily stores the digital image signal outputted from the A/D conversion unit 104.

In the pre-shooting mode or the real shooting mode, under the control of the control unit 113, the conversion property calculation unit 106 sequentially reads out the image signal from the buffer 105 so as to calculate the conversion properties which are used in space-variant gradation conversion processing. In the pre-shooting mode, the conversion property calculation unit 106 transmits the conversion properties to the exposure control unit 107. On the other hand, in the real shooting mode, the conversion property calculation unit 106 transmits the conversion properties to the gradation conversion unit 110. That is to say, in this mode, the conversion property calculation unit 106 serves as a part of the gradation conversion unit.

Under the control of the control unit 113, the exposure control unit 107 sequentially reads out the image signals from the buffer 105 with respect to multiple kinds of exposure amounts, and the conversion properties from the conversion property calculation unit 106 with respect to the aforementioned multiple kinds of exposure amounts, so as to calculate the exposure amount in the real shooting. The exposure control unit 107 controls the aperture value of the aperture 101, the electronic shutter speed of the CCD 102, the gain of the amplification unit 103, etc., based upon the exposure amount thus calculated.

In the pre-shooting mode, under the control of the control unit 113, the focus control unit 108 detects the edge magnitude in the image signal stored in the buffer 105, and controls the AF motor 109 such that the edge magnitude thus detected exhibits the maximum value, thereby acquiring a focused image signal.

The AF motor 109 is a driving source which drives an AF lens included within the lens system 100 under the control of the focus control unit 108.

The gradation conversion unit 110 is a conversion processing unit which reads out the image signal in the real shooting from the buffer 105, and the conversion properties from the conversion property calculation unit 106, and performs space-variant conversion processing for the image signal, under the control of the control unit 113.

Under the control of the control unit 113, the signal processing unit 111 performs known edge enhancement processing, compression processing etc., for the image signal subjected to the gradation conversion processing thus outputted from the gradation conversion unit 110, and transmits the signal thus subjected to the processing to the output unit 112.

The output unit 112 stores the image signal outputted from the signal processing unit 111 in a storage medium such as a memory card or the like.

The control unit 113 comprises a microcomputer or the like, for example. The control unit 113 is connected to the amplification unit 103, the A/D conversion unit 104, the conversion property calculation unit 106, the exposure control unit 107, the focus control unit 108, the gradation conversion unit 110, the signal processing unit 111, the output unit 112, and the external I/F unit 114, in a bidirectional manner, thereby controlling the overall operation of the camera system including these components. The control unit 113 serves as a real shooting control unit, a pre-shooting control unit, a dark-region ineffective pixel estimation unit, a bright-region ineffective pixel estimation unit, an exposure amount calculation unit, a threshold setting unit, a noise amount estimation unit, an image quality adjustment unit, a high-luminance region adjustment unit, a high-sensitivity region adjustment unit, a shooting situation estimation unit, and a manual adjustment unit. Furthermore, the control unit 113 is configured such that it receives a signal from the temperature sensor 115.

The external I/F unit 114 serves as an exposure amount calculation unit, an image quality adjustment unit, and an interface unit, which allows the user to perform input operations and so forth, for the camera system. The external I/F unit 114 has a configuration including a power supply switch which allows the user to turn the power supply on and off, a shutter button which allows the user to start the shooting operation, a mode switching button which allows the user to switch the current mode to one from among various kinds of modes such as the shooting mode, etc. Specifically, the external I/F unit 114 allows the user to input an instruction to start the pre-shooting operation by half pressing a two-stage shutter button, and to input an instruction to start the real shooting operation by full pressing this shutter button. Furthermore, with such an arrangement, the user can adjust the shooting conditions such as the ISO sensitivity etc., through the external I/F unit 114. The external I/F unit 114 outputs the information thus inputted to the control unit 113.

Next, description will be made regarding the operation of the camera system as shown in FIG. 1 with reference to the flow of the image signal.

Before the shooting operation, the user sets the shooting conditions such as the ISO sensitivity etc., beforehand through the external I/F unit 114.

Subsequently, when the user half-presses the shutter button provided in the external I/F unit 114 in the form of a two-step switch, the camera system enters the pre-shooting mode.

Then, the CCD 102 performs photoelectric conversion of the image of the subject formed through the lens system 100 and the aperture 101, thereby outputting the subject image in the form of an analog image signal.

In the pre-shooting mode, under the control of the control unit 113, the exposure control unit 107 adjusts the aperture 101 with a predetermined aperture value, and sets the electronic shutter speed of the CCD 102 to a predetermined speed. Shooting is performed under this condition.

After the shooting under such a condition, the analog image signal outputted from the CCD 102 is amplified by the amplification unit 103 with a predetermined gain according to the ISO sensitivity set by the user.

The image signal thus amplified by the amplification unit 103 is converted by the A/D conversion unit 104 into a digital image signal, and the digital image signal thus converted is transmitted to and stored in the buffer 105.

The image signal thus stored in the buffer 105 is, first, transmitted to the focus control unit 108.

The focus control unit 108 detects the edge magnitude based upon the image signal, as described above. The focus control unit 108 controls the AF motor 109 so that the edge magnitude thus detected exhibits the maximum value, thereby obtaining a focused signal.

After the completion of the focus control processing, the exposure control unit 107 sets multiple kinds of different exposure amounts under the control of the control unit 113.

With such an arrangement, pre-shooting is performed multiple times based upon the respective exposure amounts thus set.

With the present embodiment, let us consider an arrangement in which shooting is performed based upon three kinds of exposure amounts. Description will be made with reference to FIG. 2 regarding the three kinds of exposure amounts in the pre-shooting mode.

The three kinds of exposure amounts shown in FIG. 2 are set at intervals of 4EV (exposure value).

In a case where an aperture value is set to a certain constant value, the aforementioned exposure amount settings can be made by setting the shutter speeds to, for example, $\frac{1}{15}$ seconds, $\frac{1}{250}$ seconds, and $\frac{1}{4000}$ seconds, respectively.

While FIG. 2 shows an arrangement employing three kinds of exposure amounts, the present invention is not restricted to such an arrangement. For example, an arrangement may be made employing two kinds of exposure amounts, thereby providing high-speed processing. Also, an arrangement may be made employing four kinds of exposure amounts, thereby high-precision processing.

While FIG. 2 shows an arrangement in which the exposure amounts are set such that the difference between the adjacent exposure amount curves is 4 EV, the present invention is not restricted to such an arrangement. The difference between the adjacent exposure amount curves may be set according to the dynamic range of the image pickup device thus employed, i.e., the dynamic range of the CCD 102 in the present embodiment.

Also, the present invention is not restricted to such an arrangement in which the exposure amounts are set such that the difference between the adjacent exposure amount curves matches the dynamic range of the image pickup device thus employed. For example, an arrangement may be made in which the exposure amounts are set such that the dynamic ranges acquired for the adjacent exposure amount curves overlap with each other, thereby improving the precision. Alternatively, an arrangement may be made in which the exposure amounts are set such that there is a predetermined gap between the dynamic ranges acquired for the adjacent exposure amount curves, thereby handling a large dynamic range while reducing the number of shooting times.

The image signals thus acquired with the multiple kinds of exposure amounts as described above are transmitted to the buffer 105. Here, with the present embodiment, the image signals thus acquired with the three kinds of exposure amounts as shown in FIG. 2 are stored in the buffer 105.

Under the control of the control unit 113, the conversion property calculation unit 106 sequentially reads out from the buffer 105 the image signals thus acquired with three kinds of exposure amounts, and calculates the conversion properties used for space-variant gradation conversion processing for each image signal. In the pre-shooting mode, the conversion property calculation unit 106 transmits the three kinds of gradation conversion properties to the exposure control unit 107.

Under the control of the control unit 113, the exposure control unit 107 sequentially reads out from the buffer 105 the image signals acquired with the three kinds of exposure amounts, and reads out from the conversion property calculation unit 106 the conversion properties with respect to the three kinds of exposure amounts, and calculates the exposure amount in the real shooting.

After the completion of the focus adjustment operation and the calculation of the exposure amount, upon the user full pressing a two-stage shutter button included in the external I/F unit 114, the camera system enters the real shooting mode.

Then, like the pre-shooting mode, the image signal is transmitted to the buffer 105. The real shooting is performed based on the exposure amount thus obtained by the exposure control unit 107 and the focus condition thus obtained by the focus control unit 108. These conditions for the real shooting are transmitted to the control unit 113.

Under the control of the control unit 113, the conversion property calculation unit 106 reads out from the buffer 105 the image signal acquired in the real shooting, and calculates the conversion properties used in the space variant gradation conversion processing. The conversion property calculation unit 106 transmits the gradation conversion properties thus calculated to the gradation conversion unit 110 in the real shooting.

Under the control of the control unit 113, the gradation conversion unit 110 reads out from the buffer 105 the image signal acquired in the real shooting, and reads out the conversion properties from the conversion property calculation unit 106, and performs the space-variant gradation conversion processing on the image signal. Then, the gradation conversion unit 110 transmits the image signal thus subjected to the gradation conversion processing to the signal processing unit 111.

The signal processing unit 111 performs known edge enhancement processing, compression processing, etc., on the image signal thus subjected to the gradation conversion processing by the gradation conversion unit 110 as described above, and transmits the signal thus subjected to image processing to the output unit 112.

The output unit 112 stores the image signal thus outputted from the signal processing unit 111 in a recording medium such as a memory card or the like.

Next, description will be made regarding an example of the configuration of the conversion property calculation unit 106 with reference to FIG. 3.

The conversion property calculation unit 106 includes a reducing unit 200, a buffer 201, a dividing unit 202, a gradation conversion curve calculation unit 203, a buffer 204, an extraction unit 205, a distance calculation unit 206, an interpolation calculation unit 207, a buffer 208, a gain calculation unit 209, a buffer 210, an enlarging unit 211, and a buffer 212.

The buffer 105 is connected to the buffer 201 through the reducing unit 200. The buffer 201 is connected to each of the dividing unit 202, the extraction unit 205, and the gain calculation unit 209. The dividing unit 202 is connected to the interpolation calculation unit 207 via the gradation conversion curve calculation unit 203 and the buffer 204. The extraction unit 205 is connected to the interpolation calculation unit 207 through the distance calculation unit 206. The interpolation calculation unit 207 is connected to the enlarging unit 211 via the buffer 208, the gain calculation unit 209, and the buffer 210. The enlarging unit 211 is connected to each of the exposure control unit 107 and the gradation conversion unit 110 via the buffer 212.

Furthermore, the control unit 113 is connected to the reducing unit 200, the dividing unit 202, the gradation conversion curve calculation unit 203, the extraction unit 205, the distance calculation unit 206, the interpolation calculation unit 207, the gain calculation unit 209, and the enlarging unit 211 in a bidirectional manner, thereby controlling these components.

Subsequently, description will be made regarding the operation of the conversion property calculation unit 106 having such a configuration.

Under the control of the control unit 113, the reducing unit 200 reads out an image signal from the buffer 105, and converts this image signal into a reduced-size signal at a predetermined reduction ratio, thereby creating a reduced-size signal with a predetermined size. With the present embodiment, the reducing unit 200 converts a image signal into a reduced-size signal with a size of 160×120 pixels which is the same size of a thumbnail image.

The reduced-size signal thus reduced by the reducing unit 200 is transmitted to and stored in the buffer 201.

Under the control of the control unit 113, the dividing unit 202 reads out the aforementioned reduced-size signal from the buffer 201, and divides the reduced-size signal into multiple regions with a predetermined size, e.g., with an image size of 20×15 pixels without overlap. In this case, the reduced-size signal is divided into a total of 64 regions having a size of 8×8 regions. FIG. 4 shows the reduced-size signal divided into multiple regions. Then, the dividing unit 202 sequentially transmits the regions thus divided to the gradation conversion curve calculation unit 203.

The gradation conversion curve calculation unit 203 calculates a cumulative histogram for each of the regions thus transmitted from the dividing unit 202 so as to calculate a gradation conversion curve used in the gradation conversion processing. The gradation conversion curve calculation unit 203 sequentially transmits the gradation conversion curves, each of which is calculated for each region, to the buffer 204.

After the completion of the gradation conversion curve calculation processing for all the regions by the gradation conversion curve calculation unit 203, the extraction unit 205 extracts a pixel value of target pixel in increments of one pixel from the reduced-size signal stored in the buffer 201, and sequentially transmits the pixel value and corresponding coordinate values of target pixel thus extracted to the distance calculation unit 206.

The distance calculation unit 206 calculates four regions positioned in neighborhood of the target pixel with respect to each target pixel extracted by the extraction unit 205, and calculates the distance between the target pixel and each of the four regions.

Description will be made with reference to FIG. 5 regarding the layout of the target pixel and the four regions positioned in the neighborhood of the target pixel.

Here, the distance between the target pixel and each region is obtained by calculating the distance between the position of the target pixel and the center position of each of the four regions.

The pixel value of target pixel will be represented by $P_{ij}$ (the indexes i and j represent the x and y coordinate points in the reduced-size signal). The distance between the target pixel and each of the four regions in the neighborhood of the target pixel thus calculated will be represented by $d_k$ (k=1 to 4). The gradation conversion curves of the four regions in the neighborhood of the target pixel will be represented by $T_k(\ )$.

The distance calculation unit 206 transmits the distance $d_k$ thus calculated and the target pixel $P_{ij}$ (the pixel value of target pixel $P_{ij}$ will simply be referred to as "target pixel $P_{ij}$") to the interpolation calculation unit 207.

Under the control of the control unit 113, the interpolation calculation unit 207 reads out the distance $d_k$ and the target pixel $P_{ij}$ from the distance calculation unit 206, reads out from the buffer 204 the gradation conversion curves $T_k(\ )$ for the four regions in the neighborhood of the target pixel, and performs the interpolation computation as represented in the following Expression 1, thereby calculating the target pixel $P'_{ij}$ subjected to the gradation conversion processing.

$$P'_{ij} = \frac{1}{D}\left(\frac{T_1(P_{ij})}{d_1} + \frac{T_2(P_{ij})}{d_2} + \frac{T_3(P_{ij})}{d_3} + \frac{T_4(P_{ij})}{d_4}\right) \text{ where}$$
$$D = \frac{1}{d_1} + \frac{1}{d_2} + \frac{1}{d_3} + \frac{1}{d_4}$$

[Expression 1]

Here, according to the interpolation computation represented by Expression 1, the target pixel $P_{ij}$ is subjected to the gradation conversion using the gradation conversion curves $T_k(\ )$ with respect to the respective regions, and the pixel values thus subjected to the gradation conversion are averaged inversely proportional to the distance between the target pixel and the center of the corresponding region.

The interpolation calculation unit 207 sequentially transmits the calculated target pixels $P'_{ij}$ thus subjected to the gradation conversion processing to the buffer 208.

After the completion of the aforementioned processing for all the pixels of the reduced-size signal stored in the buffer 201, under the control of the control unit 113, the gain calculation unit 209 reads out the target pixels $P_{ij}$ of the reduced-size signal from the buffer 201, and reads out from the buffer 208 the target pixels $P'_{ij}$ of the image signal thus subjected to the gradation conversion processing.

Then, the gain calculation unit 209 calculates the conversion properties $T_{ij}$, which are to be used in the gradation conversion processing, by performing the computation as represented by the following Expression 2.

$$T_{ij} = \frac{P'_{ij}}{P_{ij}}$$

[Expression 2]

The gain calculation unit 209 sequentially transmits the conversion properties $T_{ij}$ thus calculated to the buffer 210.

Under the control of the control unit 113, the enlarging unit 211 performs enlargement processing on the conversion properties $T_{ij}$ on the buffer 210 such that the size of the conversion properties thus subjected to the enlargement processing matches that of the input image signal.

Note that the conversion properties thus subjected to the enlargement processing will be represented by $T_{mn}$ (m and n represent the x and y coordinate points in the image signal).

The enlarging unit 211 transmits the conversion properties $T_{mn}$ thus subjected to the enlargement processing to the buffer 212.

The conversion properties $T_{mn}$ thus stored in the buffer 212 are transmitted to the exposure control unit 107 or the gradation conversion unit 110 as necessary.

Next, description will be made with reference to FIG. 6 regarding an example of the configuration of the exposure control unit 107.

The exposure control unit 107 includes an extraction unit 300, a noise estimation unit 301 which serves as a dark-region ineffective pixel estimation unit and a noise amount estimation unit, a gain correction unit 302 which serves as both a dark-region ineffective pixel estimation unit and a bright-region ineffective pixel estimation unit, a noise range setting unit 303 which serves as a dark-region ineffective pixel estimation unit, a dark-region ineffective pixel determination unit 304 which serves as a dark-region ineffective pixel estimation unit, a buffer 305, a dark-region ineffective pixel ratio calculation unit 306 which serves as a dark-region ineffective pixel estimation unit, a function approximation unit 307 which serves as a dark-region ineffective pixel estimation unit, a high-sensitivity region adjustment unit 308 which serves as an exposure amount calculation unit and an image quality adjustment unit, a threshold setting unit 309 which serves as a bright-region ineffective pixel estimation unit, a bright-region ineffective pixel determination unit 310 which serves as a bright-region ineffective pixel estimation unit, a buffer 311, a bright-region ineffective pixel ratio calculation unit 312 which serves as a bright-region ineffective pixel estimation unit, a function approximation unit 313 which serves as a bright-region ineffective pixel estimation unit, a high-luminance region adjustment unit 314 which serves as an exposure amount calculation unit and an image quality adjustment unit, and an exposure amount calculation unit 315 which serves as a search unit.

The buffer 105 is connected to each of the noise estimation unit 301 and the gain correction unit 302 via the extraction unit 300. Each of the conversion property calculation unit 106 and the noise estimation unit 301 is connected to the gain correction unit 302. The gain correction unit 302 is connected to each of the noise range setting unit 303, the dark-region ineffective pixel determination unit 304, the bright-region ineffective pixel determination unit 310, and the high-luminance region adjustment unit 314. The noise range setting unit 303 is connected to the dark-region ineffective pixel determination unit 304. The dark-region ineffective pixel determination unit 304 is connected to the exposure amount calculation unit 315 via the buffer 305, the dark-region ineffective pixel ratio calculation unit 306, the function approximation unit 307, and the high-sensitivity region adjustment unit 308. The threshold setting unit 309 is connected to the bright-region ineffective pixel determination unit 310. The bright-region ineffective pixel determination unit 310 is connected to the exposure amount calculation unit 315 via the buffer 311, the bright-region ineffective pixel ratio calculation unit 312, the function approximation unit 313, and the high-luminance region adjustment unit 314. The exposure amount calculation unit 315 is connected to each of the aperture 101, the CCD 102, and the amplification unit 103.

Furthermore, the control unit 113 is connected to the extraction unit 300, the noise estimation unit 301, the gain correction unit 302, the noise range setting unit 303, the dark-region ineffective pixel determination unit 304, the dark-region ineffective pixel ratio calculation unit 306, the function approximation unit 307, the high-sensitivity region adjustment unit 308, the threshold setting unit 309, the bright-region ineffective pixel determination unit 310, the bright-region ineffective pixel ratio calculation unit 312, the function approximation unit 313, the high-luminance region adjustment unit 314, and the exposure amount calculation unit 315 in a bidirectional manner, thereby controlling these components.

Next, description will be made regarding the operation of the exposure control unit 107 having such a configuration.

In a case in which determination has been made that the current mode enters the pre-shooting mode via the external I/F unit 114, the control unit 113 controls the exposure amount calculation unit 315 such that the aperture value of the aperture 101 is set to a predetermined aperture value, the electronic shutter speed of the CCD 102 is set to a predetermined electronic shutter speed, and the gain of the amplification unit 103 is set to a predetermined gain that corresponds to the set ISO sensitivity.

Next, after the completion of the focus adjustment processing performed by the focus control unit 108 as described above, the control unit 113 controls the exposure amount calculation unit 315 to set multiple kinds of different exposure amounts. In the present embodiment, description is being made regarding an arrangement in which images are acquired using three kinds of exposure amounts as shown in FIG. 2 as described above. Accordingly, the exposure amount calculation unit 315 sets these three kinds of exposure amounts.

Specifically, the aperture value of the aperture 101 is set to a predetermined aperture value, the gain of the amplification unit 103 is set to a predetermined gain that corresponds to the set ISO sensitivity, and the electronic shutter speed of the CCD 102 is set to each of 1/15 seconds, 1/250 seconds, and 1/4000 seconds, thereby providing the three kinds of exposure.

After the completion of the pre-shooting using these three kinds of exposure amounts, and the transmission of the three kinds of image signals to the buffer 105, under the control of the control unit 113, the extraction unit 300 extracts from the buffer 105 the image signals that correspond to the first exposure amount as shown in FIG. 2 in increments of one pixel as a pixel value of target pixel, and transmits the extracted pixel value of target pixel to the gain correction unit 302. Furthermore, at the same time, the extraction unit 300 extracts a region having a predetermined size including the target pixel, and transmits the region thus extracted to the noise estimation unit 301.

The pixel value of each target pixel is represented by $P_{mn}$ (m and n represent the x and y coordinate points in the image signal).

As disclosed in Japanese Unexamined Patent Application Publication No. 2005-175718, under the control of the control unit 113, the noise estimation unit 301 calculates the average value $AV_{mn}$ of the region having a predetermined size including the target pixel $P_{mn}$ (the pixel value $P_{mn}$ of target pixel will simply be referred to as "target pixel $P_{mn}$" hereafter), and estimates the noise amount $N_{mn}$ with respect to the target pixel $P_{mn}$ for each pixel based upon the average value $AV_{mn}$. Then, the noise estimation unit 301 transmits the average value $AV_{mn}$ and the noise amount $N_{mn}$ to the gain correction unit 302.

Under the control of the control unit 113, the gain correction unit 302 reads out from the conversion property calculation unit 106 the conversion properties $T_{mn}$ for the image signal that corresponds to the first exposure amount as shown in FIG. 2.

Subsequently, the gain correction unit 302 multiplies the noise amount $N_{mn}$ thus transmitted from the noise estimation unit 301 by the conversion property $T_{mn}$ thus transmitted from the conversion property calculation unit 106 as represented by the following Expression 3, thereby calculating the noise amount $N'_{mn}$ subjected to the gradation conversion processing.

$$N'_{mn} = T_{mn} \cdot N_{mn} \qquad \text{[Expression 3]}$$

Furthermore, the gain correction unit 302 multiplies the target pixel $P_{mn}$ thus transmitted from the extraction unit 300 by the conversion property $T_{mn}$ thus transmitted from the conversion property calculation unit 106, thereby calculating the target pixel $P'_{mn}$ subjected to the gradation conversion processing.

$$P'_{mn} = T_{mn} \cdot P_{mn} \qquad \text{[Expression 4]}$$

The gain correction unit 302 transmits the noise amount $N'_{mn}$ thus subjected to the gradation conversion processing and the average value $AV_{mn}$ to the noise range setting unit 303. Furthermore, the gain correction unit 302 transmits the image signal $P'_{mn}$ thus subjected to the gradation conversion processing to each of the dark-region ineffective pixel determination unit 304, the bright-region ineffective pixel determination unit 310, and the high-luminance region adjustment unit 314.

Under the control of the control unit 113, the noise range setting unit 303 calculates the upper limit $U_{mn}$ and the lower limit $L_{mn}$, which determine the noise range, based upon the noise amount $N'_{mn}$ and the average value $AV_{mn}$ thus transmitted from the gain correction unit 302 as represented by the following Expression 5.

$$U_{mn}=AV_{mn}+N'_{mn}/2$$

$$L_{mn}=AV_{mn}-N'_{mn}/2 \quad \text{[Expression 5]}$$

Then, the noise range setting unit 303 transmits the upper limit $U_{mn}$ and the lower limit $L_{mn}$ thus calculated to the dark-region ineffective pixel determination unit 304.

Under the control of the control unit 113, the dark-region ineffective pixel determination unit 304 determines whether or not the target pixel $P'_{mn}$ is within the noise range based upon the target pixel $P'_{mn}$ thus transmitted from the gain correction unit 302 with reference to the upper limit $U_{mn}$ and the lower limit $L_{mn}$ with respect to the noise thus transmitted from the noise range setting unit 303. Here, in a case in which the condition represented by the following Expression 6 is satisfied, determination is made that the target pixel $P'_{mn}$ is within the noise range.

$$U_{mn} \geq P'_{mn} \geq L_{mn} \quad \text{[Expression 6]}$$

On the other hand, in a case in which the condition as represented by the Expression 6 is not satisfied for the target pixel $P'_{mn}$, the dark-region ineffective pixel determination unit 304 determines that the target pixel $P'_{mn}$ is outside of the noise region.

Then, the dark-region ineffective pixel determination unit 304 outputs the aforementioned determination result to the buffer 305 in a form of label information. As a specific example, in a case in which the target pixel is within the noise region, the dark-region ineffective pixel determination unit 304 outputs a value 1 as a label. On the other hand, in a case in which the target pixel is outside of the noise region, the dark-region ineffective pixel determination unit 304 outputs a value 0 as a label.

Furthermore, under the control of the control unit 113, the bright-region ineffective pixel determination unit 310 determines based upon the target pixel $P'_{mn}$ transmitted from the gain correction unit 302 with reference to the threshold Th transmitted from the threshold setting unit 309 whether or not the probability of the target pixel $P'_{mn}$ being in the "whiteout" state is high. Here, the aforementioned threshold Th is set based upon the reference white value defined by the camera system. For example, in a case in which the gradation level of the image signal is provided in a range of 12 bits (dynamic range: 0 to 4095), the threshold Th is set to 3800 or the like.

That is to say, in a case in which the following Expression 7 is satisfied, the bright-region ineffective pixel determination unit 310 determines that the target pixel $P'_{mn}$ is in the "whiteout" state. On the other hand, in a case in which the following Expression 7 is not satisfied, the bright-region ineffective pixel determination unit 310 determines that the target pixel $P'_{mn}$ is not in the "whiteout" state.

$$P'_{mn} \geq Th \quad \text{[Expression 7]}$$

Then, the bright-region ineffective pixel determination unit 310 transmits the aforementioned determination result to the buffer 311 in the form of label information. As a specific example, in a case in which the target pixel is in the "whiteout" state, the bright-region ineffective pixel determination unit 310 outputs a value 1 as a label. On the other hand, in a case in which the target pixel is not in the "whiteout" state, the bright-region ineffective pixel determination unit 310 outputs a value 0 as a label.

The determination processing by the dark-region ineffective pixel determination unit 304 and the determination processing by the bright-region ineffective pixel determination unit 310 are performed on the image signal that corresponds to the second exposure amount and the image signal that corresponds to the third exposure amount as shown in FIG. 2 in the same way as is performed on the first exposure amount. As a result, the label information with respect to the image signals that correspond to the three kinds of exposure amounts is transmitted to the buffer 305 and the buffer 311.

Under the control of the control unit 113, the dark-region ineffective pixel ratio calculation unit 306 reads out from the buffer 305 the label information with respect to whether or not each target pixel $P'_{mn}$ is within the noise range, and calculates the ratio of the pixels within the noise range as to all the pixels of the image signal.

The dark-region ineffective pixel ratio calculation unit 306 calculates the aforementioned ratio for each of the image signals that correspond to the three kinds of exposure amounts, and transmits the calculation results to the function approximation unit 307 as the dark-region ineffective pixel ratio.

Under the control of the control unit 113, the function approximation unit 307 formulates a quadratic functional expression for the dark-region ineffective pixel ratio $R_d$ of the relation between the three kinds of dark-region ineffective pixel ratios and the three kinds of exposure amounts (EV) from the dark-region ineffective pixel ratio calculation unit 306 as represented by the following Expression 8.

$$R_d=\alpha EV^2+\beta EV+\gamma \quad \text{[Expression 8]}$$

Here, $\alpha$, $\beta$, and $\gamma$ are constant terms.

The function approximation unit 307 transmits the functional expression as represented by the Expression 8 to the high-sensitivity region adjustment unit 308.

On the other hand, under the control of the control unit 113, the bright-region ineffective pixel ratio calculation unit 312 reads out from the buffer 311 the label information with respect to whether or not each target pixel $P'_{mn}$ is in the "whiteout" state, and calculates the ratio of the pixels in the "whiteout" state as to all the pixels of the image signal.

The bright-region ineffective pixel ratio calculation unit 312 calculates the aforementioned ratio for each of the image signals that correspond to the three kinds of exposure amounts, and transmits the calculation results to the function approximation unit 313 as the bright-region ineffective pixel ratio.

Under the control of the control unit 113, the function approximation unit 313 formulates a quadratic functional expression for the bright-region ineffective pixel ratio $R_b$ of the relation between the three kinds of bright-region ineffective pixel ratios and the three kinds of exposure amounts (EV) from the bright-region ineffective pixel ratio calculation unit 312 as represented by the following Expression 9.

$$R_b=\delta EV^2+\epsilon EV+\zeta \quad \text{[Expression 9]}$$

Here, $\delta$, $\epsilon$, and $\zeta$ are constant terms.

The function approximation unit 313 transmits the functional expression as represented by the Expression 9 to the high-luminance region adjustment unit 314.

FIG. 7 shows an example of the quadratic functional expression for the dark-region ineffective pixel ratio $R_d$ as represented by the Expression 8 and the quadratic functional expression for the bright-region ineffective pixel ratio $R_b$ as represented by the Expression 9.

In a case in which the exposure amount is in the underexposure state (in a case in which EV is small), the dark ineffective pixel ratio is high, and the bright-region ineffective pixel ratio is low. On the other hand, in a case in which the exposure amount is in the overexposure state (in a case in which EV is large), the dark ineffective pixel ratio is low, and the bright-region ineffective pixel ratio is high.

In a case in which the three kinds of exposure amounts set in the pre-shooting mode covers the dynamic range of the subject, the quadratic functional expression for the dark-region ineffective pixel ratio $R_d$ and the quadratic functional expression for the bright-region ineffective pixel ratio $R_b$ intersect (at an intersection) on the line graph as shown in FIG. 7.

With such an arrangement, the exposure amount that corresponds to the intersection is employed as the suitable exposure amount $EV_r$, which is well-balanced for both the number of the ineffective pixels in the dark region and the number of the ineffective pixels in the bright region.

It should be noted that the balance between the dark region and the bright region is varied based upon the situation of the shooting. For example, the effect of the noise in the dark region increases according to an increase in the ISO sensitivity, leading to a subjective problem. On the other hand, the effect of the "whiteout" in the bright region increases according to an increase in the area of the high-luminance region such as the sky, leading to a subjective problem.

In order to solve such problems, the high sensitivity region adjustment unit 308 performs correction with respect to the aforementioned ISO sensitivity. On the other hand, the high-luminance region adjustment unit 314 performs correction with respect to the area of the aforementioned high-luminance region.

The high-sensitivity region adjustment unit 308 performs correction of the quadratic functional expression for the dark-region ineffective pixel ratio $R_d$ received from the function approximation unit 307 based upon the ISO sensitivity which was used in the shooting step and which is transmitted from the control unit 113, as shown in FIG. 8.

As a specific example, the high-sensitivity region adjustment unit 308 performs processing which shifts the quadratic functional expression $R_d$ upward in increment of predetermined amounts according to an increase of the ISO sensitivity in order of 100 (base ISO sensitivity), 200, and 400.

The aforementioned correction shifts the intersection of the quadratic functional expression for the dark-region ineffective pixel ratio $R_d$ and the quadratic functional expression for the bright-region ineffective pixel ratio $R_b$, which corresponds to the suitable exposure amount, in the direction toward the overexposure state, thereby reducing the effect of the noise in the dark region.

On the other hand, the high-luminance region adjustment unit 314 performs correction of the quadratic functional expression for the bright-region ineffective pixel ratio $R_b$ received from the function approximation unit 313 based upon the image signal subjected to the gradation conversion processing by the gain correction unit 302. The high-luminance region adjustment unit 314 performs the correction based upon the area of the high-luminance region included in the image signal received from the gain correction unit 302. The term "high-luminance region" as used here represents the pixels of which values are equal to or greater than a predetermined value. For example, in a case in which the signal gradation level is provided in the range of 12 bits (dynamic range: 0 to 4095), the threshold is set to 2800 or the like.

FIG. 9 shows the correction of the quadratic functional expression for the bright-region ineffective pixel ratio $R_b$ based upon the ratio of the area of the high-luminance region.

As a specific example, the high-luminance region adjustment unit 314 performs processing which shifts the quadratic functional expression $R_b$ upward in increment of predetermined amounts according to an increase of the radio of the high-luminance region included in the image signal in order of 30% (base radio of the high-luminance region), 50%, and 70%.

The aforementioned correction shifts the intersection of the quadratic functional expression for the dark-region ineffective pixel ratio $R_d$ and the quadratic functional expression for the bright-region ineffective pixel ratio $R_b$, which is the suitable exposure amount, in the direction toward the underexposure state, thereby reducing the effect of the "whiteout" state in the bright region.

The quadratic functional expression for the dark-region ineffective pixel ratio $R_d$ thus corrected by the high-sensitivity region adjustment unit 308 and the quadratic functional expression for the bright-region ineffective pixel ratio $R_b$ corrected by the high-luminance region adjustment unit 314 are transmitted to the exposure amount calculation unit 315.

Under the control of the control unit 113, the exposure amount calculation unit 315 calculates the exposure amount EV that corresponds to the intersection of the quadratic functional expression $R_d$ transmitted from the high-sensitivity region adjustment unit 308 and the quadratic functional expression $R_b$ transmitted from the high-luminance region adjustment unit 314, and employs the exposure amount EV thus calculated as the suitable exposure amount $EV_r$.

In a case in which determination has been made that the current mode has entered the real shooting mode via the external I/F unit 114, the control unit 113 controls the exposure amount calculation unit 315 to set the aperture value of the aperture 101 and the electronic shutter speed of the CCD 102 based upon the aforementioned suitable exposure amount $EV_r$.

Next, description will be made with reference to FIG. 10 regarding an example of the configuration of the noise estimation unit 301 included in the exposure control unit 107.

The noise estimation unit 301 includes a gain calculation unit 400, a standard value supply unit 401, a lookup table unit 402, and an average calculation unit 403.

The extraction unit 300 is connected to the average calculation unit 403. Each of the average calculation unit 403, the gain calculation unit 400, and the standard value supply unit 401 is connected to the lookup table unit 402. The lookup table unit 402 is connected to the gain correction unit 302.

Furthermore, the control unit 113 is connected to the gain calculation unit 400, the standard value supply unit 401, the lookup table unit 402, and the average calculation unit 403 in a bidirectional manner, thereby controlling these components.

Next, description will be made regarding the operation of the noise estimation unit 301 having such a configuration.

The extraction unit 300 sequentially reads out from the buffer 105 the regions having a predetermined size including the target pixel $P_{mn}$ of the image signals that correspond to the three kinds of exposure amounts, and transmits the regions thus read out to the average calculation unit 403.

Under the control of the control unit 113, the average calculation unit 403 calculates the average value $AV_{mn}$ of the regions having a predetermined size including the target pixel $P_{mn}$, and transmits the average value $AV_{mn}$ thus calculated to the lookup table unit 402.

On the other hand, the gain calculation unit 400 obtains the gain of the amplification unit 103 based upon the information with respect to the ISO sensitivity and the exposure condition transmitted from the control unit 113, and transmits the gain thus obtained to the lookup table unit 402.

Furthermore, the control unit 113 acquires the temperature information with respect to the CCD 102 from the temperature sensor 115, and transmits the temperature information thus acquired to the lookup table unit 402.

The lookup table unit 402 outputs noise amount $N_{mn}$ based upon the average value $AV_{mn}$ received from the average calculation unit 403, the gain information received from the gain calculation unit 400, and the temperature information received from the control unit 113.

The lookup table unit 402 serves as a lookup table which stores the relation between each of the temperature, the signal level, the gain and the noise amount. For example, such a lookup table is formed by a means described in Japanese Unexamined Patent Application Publication No. 2005-175718.

The lookup table unit 402 transmits the noise amount $N_{mn}$ and the average value $AV_{mn}$ thus calculated to the gain correction unit 302.

It should be noted that the standard value supply unit 401 has a function whereby, in a case in which at least one of the two parameters, i.e., the temperature and the gain, cannot be acquired, the standard value supply unit 401 supplies a standard value for the parameter.

With the embodiment 1 as described above, the overall dynamic range of the entire signal can be appropriately acquired. Furthermore, a combination of this technique and space-variant gradation conversion processing allows the overall dynamic range of both the principal subject and the background region to be effectively used, thereby providing high-quality image signal.

Furthermore, calculation of the gradation conversion curve is performed for the reduced-size signal obtained by reducing the size of the image signal, thereby providing high-speed processing.

Furthermore, the gradation conversion curve is converted in increment of one pixel using interpolation processing, thereby providing high-quality image signal while maintaining the continuity between the regions.

Moreover, in the exposure amount setting processing, the change in ineffective pixels in the dark region, which has been determined giving consideration to the results of the gradation conversion processing and the noise properties, and the change in the ineffective pixels in the bright region, which has been determined giving consideration to the results of the gradation conversion processing and the reference white value, are represent by a model in the form of a functional expression. Such an arrangement allows the exposure amount to be controlled with high precision and to be automatically set, thereby improving the operability of the camera system.

In addition, the aforementioned functional expression is corrected based upon the ISO sensitivity information and the information with respect to the area of the high-luminance region, thereby providing a subjectively preferable image signal.

While description has been made above regarding an arrangement in which the noise amount is estimated in increments of one pixel, the present invention is not restricted to such an arrangement. For example, an arrangement may be made in which the noise amount is estimated in increments of blocks having a predetermined size. With such an arrangement, the noise amount is acquired from the lookup table 402 using the average value of each block region, and the noise amount thus obtained is used as a common noise amount for all the pixels of the same block region. Such an arrangement thins out the aforementioned noise amount estimation processing, thereby providing high-speed processing.

Description has been made above regarding an arrangement in which the conversion property calculation unit 106 is used as a conversion property calculation unit for the pre-shooting and a part of the gradation conversion unit for the real shooting. It is needless to say that the present invention is not restricted to such an arrangement. Rather, separate conversion property calculation units may be provided for the pre-shooting and the real shooting, respectively.

Embodiment 2

Figure 11:
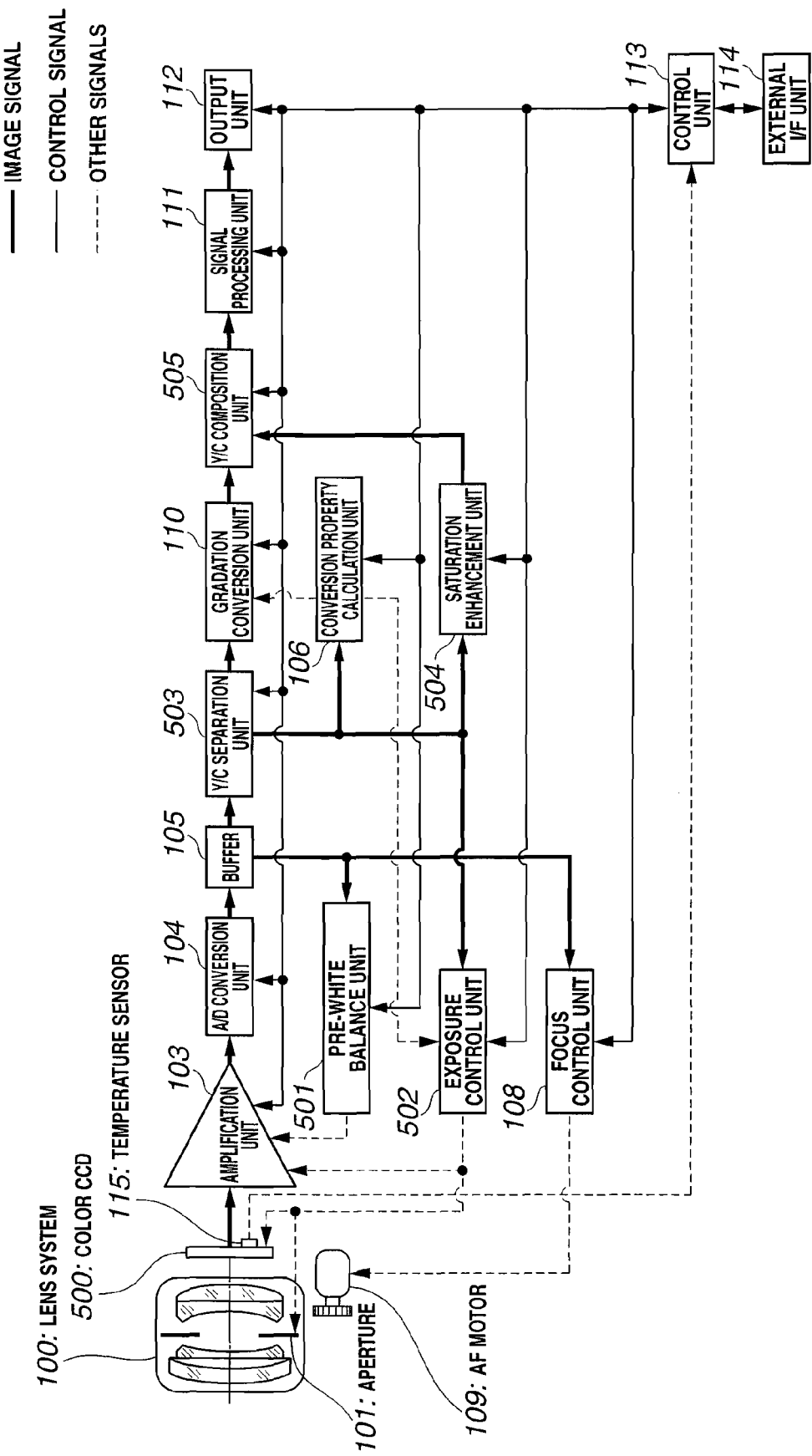
FIG. 11 is a block diagram which shows a configuration of a camera system according to an embodiment 2 of the present invention.
Figure 18:
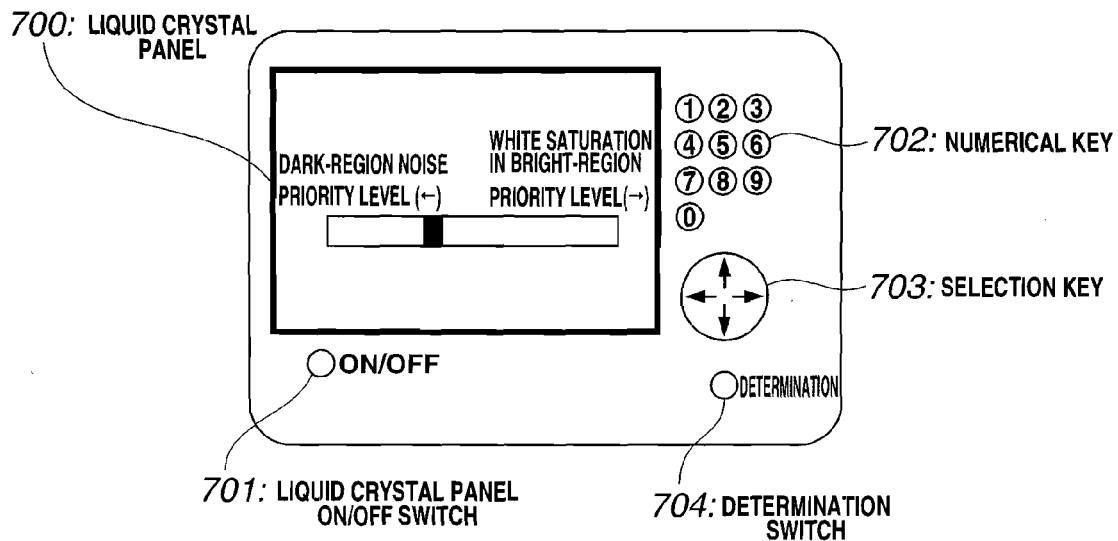
FIG. 18 is a diagram which shows a configuration of an external I/F unit employing a slider bar for adjusting the exposure amount according to the embodiment 2.
Figure 19:
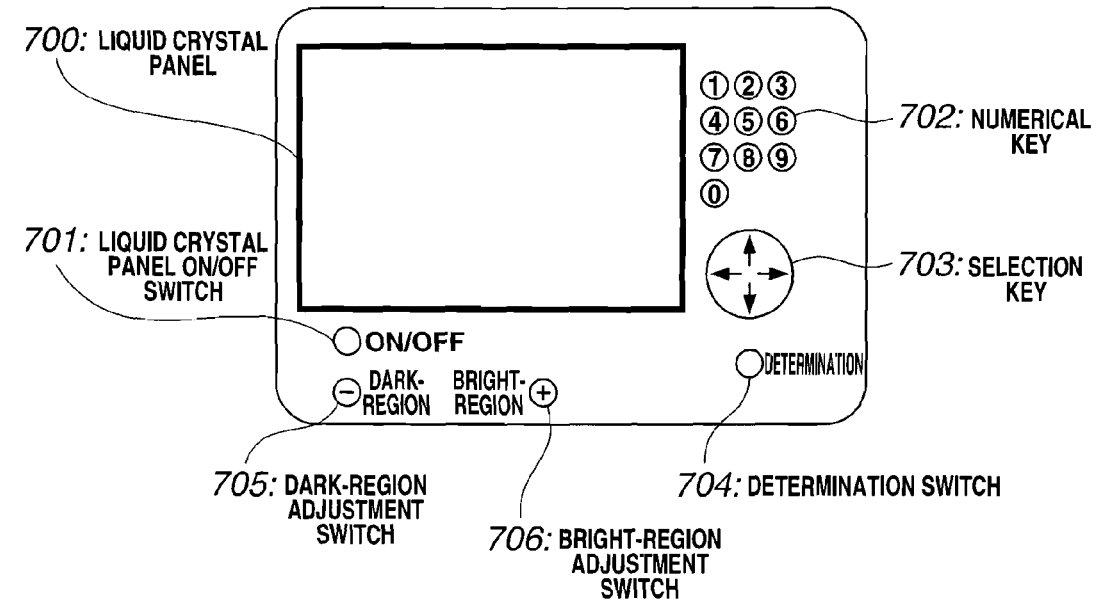
FIG. 19 is a diagram which shows a configuration of an external I/F unit employing a push button for adjusting the exposure amount according to the embodiment 2.

FIG. 11 through FIG. 19 show an embodiment 2 according to the present invention. Specifically, FIG. 11 is a block diagram which shows a configuration of a camera system. FIG. 12 is a diagram which shows a pattern of a Bayer-type primary color filter. FIG. 13 is a diagram which shows a pattern of a color-difference line-sequential complementary color filter. FIG. 14 is a block diagram which shows a configuration of the exposure control unit. FIG. 15 is a line graph which shows the ineffective pixel ratio in the bright region and the ineffective pixel ratio in the dark region according to the exposure amount and the suitable exposure amount. FIG. 16 is a diagram which shows 13 areas $a_1$ through $a_{13}$ when dividing exposure control operation is performed. FIG. 17 is a chart which shows the relation between the estimation of the shooting situations and image quality adjustment processing. FIG. 18 is a diagram which shows an example of the configuration of the external I/F unit employing a slider bar which allows the user to adjust the exposure amount. FIG. 19 is a diagram which shows an example of the configuration of the external I/F unit employing a push button which allows the user to adjust the exposure amount.

The same components in the embodiment 2 as those in the above-described embodiment 1 are denoted by the same reference numerals, and description thereof will be omitted. Description will be mainly made only regarding the difference therebetween.

Description will be made regarding the configuration of the camera system according to the present embodiment with reference to FIG. 11.

The camera system shown in FIG. 11 has generally the same configuration as that of the above-described image processing system according to the embodiment 1 shown in FIG. 1, except that a part thereof is changed. Specifically, the camera system shown in FIG. 11 has generally the same configuration as that of the embodiment 1 shown in FIG. 1, except that a pre-white balance unit 501, a Y/C separation unit 503 which serves as both a first Y/C separation unit and a second Y/C separation unit, a saturation enhancement unit 504, and a Y/C composition unit 505 are further included, and the CCD 102 and the exposure control unit 107 are replaced by a color CCD 500 which is a color image pickup device, and a exposure control unit 502, respectively. The other basic components are the same as those of the embodiment 1, and the same components will be referred to as the same names, and are denoted by the same reference numerals.

Description will be mainly made below only regarding the difference therebetween.

A color image signal acquired via the lens system 100, the aperture 101, and the color CCD 500 is transmitted to the amplification unit 103.

The buffer 105 is connected to each of the pre-white balance unit 501, the Y/C separation unit 503, and the focus control unit 108. The pre-white balance unit 501 is connected to the amplification unit 103. The exposure control unit 502 is connected to each of the aperture 101, the color CCD 500, and the amplification unit 103. The Y/C separation unit 503 is connected to each of the conversion property calculation unit 106, the gradation conversion unit 110, the exposure control unit 502, and the saturation enhancement unit 504. The conversion property calculation unit 106 is connected to each of the exposure control unit 502 and the gradation conversion unit 110. Each of the gradation conversion unit 110 and the saturation enhancement unit 504 is connected to the Y/C composition unit 505. The Y/C composition unit 505 is connected to the signal processing unit 111.

Furthermore, the control unit 113 is connected to the pre-white balance unit 501, the exposure control unit 502, the Y/C separation unit 503, the saturation enhancement unit 504, and the Y/C composition unit 505 in a bidirectional manner, thereby controlling these components.

Moreover, the signal line from the temperature sensor 115 outputted from the temperature sensor 115 disposed in the neighborhood of the color CCD 500 is connected to the control unit 113.

Next, description will be made regarding the operation of the camera system as shown in FIG. 11 with reference to the flow of the image signal. The basic operation of the camera system according to the embodiment 2 is the same as that of the above-described embodiment 1. Accordingly, description will be mainly made only regarding the difference therebetween.

When the user half-presses the shutter button provided in the external I/F unit 114 in the form of a two-step switch, the camera system enters the pre-shooting mode.

Then, the color CCD 500 performs photoelectric conversion of the image of the subject formed through the lens system 100 and the aperture 101, thereby outputting the subject image in the form of an analog color image signal.

The analog color image signal is amplified by the amplification unit 103 giving consideration to the ISO sensitivity and the white balance as described later, following which the analog image signal is converted by the A/D conversion unit 104 into a digital color image signal, which is stored in the buffer 105.

Description is being made in the present embodiment regarding an arrangement employing the color CCD 500 having a structure in which a Bayer-type primary color filter is mounted on the front face of a single image pickup device. The image pickup device is not restricted to such a CCD. Rather, CMOSs or other image pickup devices may be employed, like the above-described embodiment 1.

Now, description will be made regarding the pattern of the Bayer-type primary color filter with reference to FIG. 12.

The Bayer-type primary color filter as shown in FIG. 12 consists of basic patterns each of which is formed of 2×2 pixels. Each basic pattern includes a red filter pixel and a blue filter pixel at corners opposite to each other. Furthermore, each basic pattern includes two green filter pixels at the other corners opposite to each other.

Subsequently, the image signal stored in the buffer 105 is transmitted to each of the exposure control unit 108, and the pre-white balance unit 501.

Of these components, the pre-white balance unit 501 integrates for each color signal the image signal which is within a predetermined level range and which is stored in the buffer 105 (i.e., the image signal is cumulatively summed up for each color), thereby calculating simple white balance coefficients. The pre-white balance unit 501 transmits the coefficients thus calculated to the amplification unit 103 so as to apply gains that differ from one another in increments of color signals, thereby performing the white balance control processing.

After the completion of the white balance processing performed by the pre-white balance unit 501 and the focus adjustment processing performed by the focus control unit 108, the exposure control unit 502 sets multiple kinds of different exposure amounts under the control of the control unit 113. Then, multiple images are acquired in the pre-shooting using the multiple kinds of exposure amounts thus set. In the present embodiment, let us say that pre-shooting is made using two kinds of exposure amounts.

The image signals thus acquired using these multiple kinds of exposure amounts are transmitted to the buffer 105 as described above.

The color image signals thus stored in the buffer 105 are transmitted to the Y/C separation unit 503.

Under the control of the control unit 113, the Y/C separation unit 503 creates three color image signals, which consists of the R, G, and B signals, using known interpolation processing. Furthermore, under the control of the control unit 113, the Y/C separation unit 503 extracts the luminance signal Y and the color difference signals Cb and Cr from the three color image signals as represented by the following Expression 10.

$$Y=0.29900R+0.58700G+0.11400B$$

$$Cb=-0.16874R-0.33126G+0.50000B$$

$$Cr=0.50000R-0.41869G-0.08131B \quad \text{[Expression 10]}$$

Then, the Y/C separation unit 503 transmits the luminance signal Y, which is one of the signals thus calculated, to each of the conversion property calculation unit 106 and the exposure control unit 502.

Under the control of the control unit 113, the conversion property calculation unit 106 sequentially reads out the luminance signals Y from the Y/C separation unit 503 with respect to the two kinds of exposure amounts, and calculates the conversion properties which is to be used in the space-variant gradation conversion processing. In the pre-shooting, the conversion property calculation unit 106 transmits the conversion properties thus calculated to the exposure control unit 502.

Under the control of the control unit 113, the exposure control unit 502 sequentially reads out the luminance signals with respect to the two kinds of exposure amounts from the Y/C separation unit 503, and reads out the conversion properties with respect to the two kinds of exposure amounts from the conversion property calculation unit 106, and calculates the exposure amount used in the real shooting.

After the completion of the focus adjustment operation, the simple white balance adjustment operation, and the calculation of the exposure amount, when the user full-presses the shutter button provided in the external I/F unit 114 in the form of a two-step switch, the camera system enters the real shooting mode.

Then, like the pre-shooting, the color video image signal is transmitted to the buffer 105. In the real shooting operation, an image is acquired on the exposure amount obtained by the exposure control unit 502 and the focus condition obtained by the focus control unit 108, using the white balance coefficients obtained by the pre-white balance unit 501. These shooting conditions are transmitted to the control unit 113.

Under the control of the control unit 113, in the same way as in the pre-shooting, the Y/C separation unit 503 performs known interpolation processing on the color image signals acquired in the real shooting, so as to calculate the luminance signal Y and the color difference signals Cb and Cr according to the aforementioned Expression 10.

Of these color signals thus calculated, the Y/C separation unit 503 transmits the luminance signal to each of the conversion property calculation unit 106 and the gradation conversion unit 110, and transmits the color difference signals to the saturation enhancement unit 504.

Under the control of the control unit 113, the conversion property calculation unit 106 reads out from the Y/C separation unit 503 the luminance signal acquired in the real shooting, and calculates the conversion properties which are to be used in the space-variant gradation conversion processing. In the real shooting, the conversion property calculation unit 106 transmits the gradation conversion properties thus calculated to the gradation conversion unit 110.

Under the control of the control unit 113, the gradation conversion unit 110 reads out from the Y/C separation unit 503 the luminance signal Y acquired in the real shooting, and reads out the conversion properties from the conversion property calculation unit 106, so as to perform space-variant gradation conversion processing on the luminance signal. Then, the gradation conversion unit 110 transmits the luminance signal Y' thus subjected to the gradation conversion processing to the Y/C composition unit 505.

Under the control of the control unit 113, the saturation enhancement unit 504 reads out from the Y/C separation unit 503 the color difference signals Cb and Cr acquired in the real shooting, and performs known saturation enhancement processing. The saturation enhancement unit 504 transmits the color difference signals Cb' and Cr' thus subjected to the saturation enhancement processing to the Y/C composition unit 505.

Under the control of the control unit 113, the Y/C composition unit 505 reads out from the gradation conversion unit 110 the luminance signal Y' thus subjected to the gradation conversion processing, and reads out from the saturation enhancement unit 504 the difference color signals Cb' and Cr' thus subjected to the saturation enhancement processing. Furthermore, the Y/C composition unit 505 converts these signals into RGB signal (R', G', and B' signals) according to the following Expression 11, and transmits the RGB signals thus converted to the signal processing unit 111.

$$R' = Y' + 1.40200 Cr'$$

$$G' = Y' - 0.34414 Cb' - 0.71414 Cr'$$

$$B' = Y' + 1.77200 Cb' \quad \text{[Expression 11]}$$

The signal processing unit 111 performs known edge enhancement processing, compression processing, etc., on the R', G', and B' signals from the Y/C composition unit 505, and transmits the signals thus subjected to such image processing to the output unit 112.

The output unit 112 stores the color image signal thus outputted from the signal processing unit 111 in a recording medium such as a memory card or the like.

Next, an example of the configuration of the exposure control unit 502 will be described with reference to FIG. 14.

The exposure control unit 502 shown in FIG. 14 is a partial modification of the exposure control unit 107 shown in FIG. 6 in the above-described embodiment 1. That is to say, the exposure control unit 502 has a configuration in which the following have been added to the exposure control unit 107; a focus position estimation unit 600 also serving as an exposure amount calculation unit, image quality adjustment unit, and shooting situation estimation unit, a subject distribution estimation unit 601 also serving as an exposure amount calculation unit, image quality adjustment unit, and shooting situation estimation unit, a night scene estimation unit 602 also serving as an exposure amount calculation unit, image quality adjustment unit, and a shooting situation estimation unit, and shooting situation estimation unit, an integrating unit 603 also serving as an exposure amount calculation unit, image quality adjustment unit, and shooting situation estimation unit, shooting situation adjustment unit 604 also serving as an exposure amount calculation unit and image quality adjustment unit, and an exposure control section 607 also serving as an exposure amount calculation unit, image quality adjustment unit, and shooting situation estimation unit, with the high-sensitivity region adjustment unit 308 being replaced with a dark-region ineffective pixel ratio adjustment unit 605 also serving as an exposure amount calculation unit, image quality adjustment unit, and manual adjustment unit, and the high-luminance region adjustment unit 314 being replaced with a bright-region ineffective pixel ratio adjustment unit 606 also serving as an exposure amount calculation unit, image quality adjustment unit, and manual adjustment unit. Other basic configurations in the exposure control unit 502 are the same as with the exposure control unit 107 shown in FIG. 6, and accordingly components which are the same are given the same names and denoted with the same reference numerals, with description thereof being omitted as appropriate, so primarily only the different portions will be described below.

The extraction unit 300 is connected to each of the noise estimation unit 301, the gain correction unit 302, and the exposure control section 607. The gain correction unit 302 is connected to each of the noise range setting unit 303, the dark-region ineffective pixel determination unit 304, and the bright-region ineffective pixel determination unit 310. The focus position estimation unit 600, the subject distribution estimation unit 601, and a night scene estimation unit 602 are each connected to the integrating unit 603. The integrating unit 603 is connected to the shooting situation adjustment unit 604. The shooting situation adjustment unit 604 and the function approximation unit 307 are each connected to the dark-region ineffective pixel ratio adjustment unit 605. The shooting situation adjustment unit 604 and the function approximation unit 313 are each connected to the bright-region ineffective pixel ratio adjustment unit 606. The dark-region ineffective pixel ratio adjustment unit 605 and the bright-region ineffective pixel ratio adjustment unit 606 are each connected to the exposure amount calculation unit 315.

Also, the control unit 113 is connected in a bidirectional manner to the focus position estimation unit 600, subject distribution estimation unit 601, night scene estimation unit 602, integrating unit 603, shooting situation adjustment unit 604, dark-region ineffective pixel ratio adjustment unit 605, bright-region ineffective pixel ratio adjustment unit 606, and exposure control section 607, so as to control these as well.

Next, the operations of the exposure control unit 502 will be described.

In a case in which determination is made by way of the external I/F unit 114 that the mode is the pre shooting mode, the control unit 113 controls the exposure amount calculation unit 315 to set the aperture 101 to a predetermined aperture value, set a color CCD 500 to a predetermined electronic shutter speed, and the amplification unit 103 to a predetermined gain according to the ISO sensitivity that has been set, as with the first embodiment described above.

Next, following completion of the focusing processing by the focus control unit 108 and white balance processing by a white balance unit 501 as described above, the control unit 113 controls the exposure amount calculation unit 315 to set multiple kinds of different exposure amounts. As described above, the present embodiment assumes shooting with two kinds of exposure amounts.

Specifically, two kinds of exposure amounts can be realized by setting the aperture 101 to a predetermined aperture value, the amplification unit 103 to a predetermined gain according to the ISO sensitivity that has been set, and the electronic shutter speed of the color CCD 500 to 1/30 and 1/200 seconds respectively.

The function approximation unit 307 formulates a linear functional expression for dark-region ineffective pixel ratio $R_d$ of the relation between the two kinds of dark-region ineffective pixel ratio and the two kinds of exposure amount (EV) from the dark-region ineffective pixel ratio calculation unit 306 with respect to the luminance signals that correspond to the image signals acquired with these two kinds of exposure amounts, as represented by the following expression 12.

$$R_d = \eta EV + \theta \qquad \text{[Expression 12]}$$

Here, $\eta$ and $\theta$ are constant terms.

The function approximation unit 307 transfers a functional expression such as shown in Expression 12 to the dark-region ineffective pixel ratio adjustment unit 605.

Also, with regard to the luminance signals relating to the image signals acquired with these two kinds of exposure amounts, under the control of the control unit 113, the function approximation unit 313 formulates a linear functional expression for the bright-region ineffective pixel ratio $R_b$ of the relation between the two kinds of bright-region ineffective pixel ratio and the two kinds of exposure amount (EV) from the bright-region ineffective pixel ratio calculation unit 312, as represented by the following expression 13.

$$R_b = \iota EV + \kappa \qquad \text{[Expression 13]}$$

Here, $\iota$ and $\kappa$ are constant terms.

The function approximation unit 313 transfers a functional expression such as shown in Expression 13 to the bright-region ineffective pixel ratio adjustment unit 606.

FIG. 15 illustrates an example of a linear functional expression for dark-region ineffective pixel ratio $R_d$ such as shown in Expression 12 and a linear functional expression for bright-region ineffective pixel ratio $R_b$ such as shown in Expression 13.

In the same way as described above, the exposure amount corresponding to the intersection of the two linear functional expressions is the suitable exposure amount EVr which is well-balanced for both the number of the ineffective pixels in the dark region and the number of the ineffective pixels in the bright region.

It should be noted that, as described above, the balance between the dark region and the bright region is varied based upon the situation for each shooting. Accordingly, with the present embodiment, the balance between the bright dark region and the bright region is automatically corrected by estimating the situation for each shooting.

That is to say, first, the focus position estimation unit 600 obtains focal distance information from the focus control unit 108, via the control unit 113. The focus position estimation unit 600 then performs classification into three classes of, for example, scenery (5 m or farther), portrait (1 m to 5 m), and close-up (1 m or closer), based on the obtained focal distance, and transfers the same to the integrating unit 603 as AF information.

On the other hand, the exposure control section 607 reads in luminance signals Y with respect to the real shooting from the extraction unit 300, and calculates information relating to exposure control.

Now, an example of division pattern for exposure control will be described with reference to FIG. 16.

With the example shown in FIG. 16, the exposure control section 607 divides the exposure measurement region into thirteen regions, calculating the luminance value for each region ($a_i$, i=1 through 13), and the average luminance value of the entire signal. The exposure control section 607 then transfers the calculated luminance value $a_i$ for each region, and the average luminance value of the entire signal, to the control unit 113.

The subject distribution estimation unit 601 obtains the luminance value ai as information relating to exposure control via the control unit 113. Subsequently, the subject distribution estimation unit 601 calculates the following parameters $S_1$ through $S_3$ as shown in Expression 14 through Expression 16, based on luminance value $a_i$ for each region.

$$S_1 = |a_2 - a_3| \qquad \text{[Expression 14]}$$

$$S_2 = \max(|a_4 - a_6|, |a_4 - a_7|) \qquad \text{[Expression 15]}$$

$$S_3 = \max(a_{10}, a_{11}) - (\Sigma a_i)/13 \qquad \text{[Expression 16]}$$

Here, the symbol || at the right in Expression 14 and Expression 15 indicates an absolute value, and the symbol max( ) at the right in Expression 15 and Expression 16 indicates a function of returning the maximum value from among the numerals within the parenthesis. Also, $\Sigma$ at the right in Expression 16 indicates the summation with respect to all i (i.e., i=1 through 13), and the second term at the right in Expression 16 represents the average luminance level for all exposure regions (the average luminance level of the entire signal).

Thus, the parameter $S_1$ means the lateral luminance difference across the center portion, $S_2$ means the greater luminance difference between the upper center and one of the upper-left side and upper-right side on the inner perimeter, and $S_3$ means the difference between the average luminance of the entire signal and the greater luminance selected from among the luminance of the upper-left side and the upper-right side on the outer perimeter.

The subject distribution estimation unit 601 transfers the three parameters $S_1$, $S_2$, and $S_3$, thus calculated, to the integrating unit 603 as AE information.

Further, the night scene estimation unit 602 obtains information relating to exposure control, via the control unit 113. The night scene estimation unit 602 then estimates the situation to be night scene shooting in a case in which the average luminance level of the entire signal is at or below a predetermined threshold, and otherwise estimates the situation not to be night scene shooting.

The night scene estimation unit 602 transfers the results thus estimated to the integrating unit 603 as night scene shooting information.

The integrating unit 603 estimates the situation for each shooting as shown in FIG. 17, based on the AF information from the focus position estimation unit 600, the AE information from the subject distribution estimation unit 601, and the night scene shooting information from the night scene estimation unit 602.

That is to say, first, in a case in which the information from the night scene estimation unit 602 is estimated to be night scene shooting, the integrating unit 603 determines the situation for the shooting as being a night scene.

Also, in a case in which the information from the night scene estimation unit 602 is estimated to be other than night scene shooting, the integrating unit 603 further estimates the situation for the shooting using the above AF information and AE information.

First, in a case in which the AF information is scenery, the parameter $S_3$ of the AF information is further compared with a first predetermined value $Th_1$. This parameter $S_3$ is for obtaining the difference between the upper portion of the image and the average value of the entire image, so in a case in which there is no sky at the upper portion of the background for each shooting for scenery, this value is small, and in a case in which there is sky, the value is great. Accordingly, in a case in which the parameter $S_3$ is greater than the first predetermined value $Th_1$, estimation is made that this is scenery shooting with sky above, and in the event of being equal or smaller, estimation is made that this is scenery shooting with no or little sky above.

Next, in a case in which the AF information is portrait, the parameter $S_2$ of the AE information is further compared with a second predetermined value $Th_2$. This parameter $S_2$ is for selecting the greater of differences between the upper-central portion and the left and right sides thereof, and accordingly, in the event of shooting multiple subjects in each shooting, the value is small, and in the event of shooting a single subject, the value is great. Accordingly, in a case in which the parameter $S_2$ is greater than the second predetermined value $Th_2$, estimation is made that this is portrait shooting of a single subject, and in the event of being equal or smaller, estimation is made that this is portrait shooting of multiple subjects.

Also, in a case in which the AF information is close-up, the parameter $S_1$ of the AE information is further compared with a third predetermined value $Th_3$. This parameter $S_1$ is for selecting the difference between the left and right sides of the center region, and accordingly, in the event of shooting a single object in the shooting, the value is small, and in the event of shooting multiple objects, the value is great. Accordingly, in a case in which the parameter $S_1$ is greater than the third predetermined value $Th_3$, estimation is made that this is close-up shooting of a single subject, and in the event of being equal or smaller, estimation is made that this is close-up shooting of multiple objects.

The integrating unit 603 transfers the shooting situation thus estimated to the shooting situation adjustment unit 604.

Based on the shooting situation from the integrating unit 603, the shooting situation adjustment unit 604 corrects one of the linear functional expression for dark-region ineffective pixel ratio $R_d$ from the function approximation unit 307 and the linear functional expression for bright-region ineffective pixel ratio $R_b$ from the function approximation unit 313 as shown in the far right column in FIG. 17.

For example, with scenery shooting with sky above, whiteout is given particular consideration, and the linear functional expression for bright-region ineffective pixel ratio $R_b$ regarding bright-region ineffective pixel ratio is shifted upwards by +20%. This correction changes the suitable exposure amount toward underexposure, so effects of whiteout in the bright regions can be reduced.

Also, with night scene shooting, noise is given particular consideration, and the linear functional expression for dark-region ineffective pixel ratio $R_d$ regarding dark-region ineffective pixel ratio is shifted upwards by +30%. This correction changes the suitable exposure amount toward overexposure, so effects of noise in the dark regions can be reduced.

With the embodiment 2 thus configured, the dynamic range of the entire signal can be suitably acquired, and by combination with space-variant gradation conversion processing, high-quality image signals can be obtained, effectively utilizing the overall dynamic range including not only the main subject but also the background.

Also, space-variant gradation conversion processing can be applied to color image signals, thereby improving compatibility with conventional camera systems, so as to be usable with a wide variety of image pickup systems.

Further, which of the bright region and dark position is to be given prior consideration is adjusted suitably with the shooting situation, so subjectively preferable image signals can be obtained.

Gradation adjustment is automatically performed, so operability of the camera system can be improved.

Note that a single CCD with a Bayer-type primary color filter arranged at the front has been assumed for the color image sensor in the above, but needs not be restricted to an imaging sensor with such a configuration. For example, a single CCD imaging sensor having a color-difference line-sequential complementary color filter such as shown in FIG. 13 mounted on the front face thereof, or two CCD or three CCD imaging sensors may be applied.

Now, the color-difference line-sequential complementary color filter shown in FIG. 13 for example, is arrangement having cyan (Cy) and yellow (Ye) on the same line of 2×2 pixels, and magenta (Mg) and green (G) on the other same line. Note however, that the positions of magenta (Mg) and green (G) are inverted each line.

Further, description has been made above such that the shooting situation is automatically estimated and one of the dark regions and bright regions is given prior consideration, but the invention is not restricted to such a configuration. For example, a configuration may be made in which the user manually adjusts which of dark-region noise and bright-region whiteout to be given prior consideration to, and to what degree of consideration to be given thereon.

An example of a specific configuration of the external I/F unit 114 wherein consideration of dark regions and bright regions can be manually adjusted will be described with reference to FIG. 18.

As shown in FIG. 18, arranged on the back face side of, for example, a camera main body of a camera system, are a liquid crystal panel 700, a liquid crystal panel on/off switch 701, numerical value keys 702, a selection key 703, and a determination switch 704, provided as part of the external I/F unit 114.

The liquid crystal panel 700 is a display device capable of monitor display of a subject to be shot, display for confirmation of a shot image, menu display relating to various settings of the camera system, and so forth.

The liquid crystal panel on/off switch 701 is an operating switch for switching display of the liquid crystal panel 700 between on and off, and is a toggle switch whereby on and off are switched between each time pressed.

The numerical value keys 702 are a numerical keypad for inputting numerical values to the camera system.

The selection key 703 is an operating member capable of vertical/horizontal operations for moving among items displayed in menus, moving a later-described slide bar.

The determination switch 704 is a switch for determining numerical values inputted by the numerical value keys 702, and items moved or selected by the selection key 703.

Next, the operations of the external I/F unit 114 shown in FIG. 18 will be described.

The user can use the selection key 703 and determination switch 704 to display a menu relating to AE control.

The user then performs operations to display a slide bar for adjusting which of the dark region and bright region to be given consideration to, as shown in FIG. 18.

Next, the user moves the slide bar to the left or right by performing pressing operations of the selection key 703 on the left or right, such that the balance of dark regions and bright regions is a desired state.

Thereafter, the user presses the determination switch 704, so as to determine the selected balance of dark regions and bright regions.

The balance information thus set via the external I/F unit 114 is transferred to the exposure control unit 502 via the control unit 113, and correction is preformed at the exposure control unit 502.

Next, description will be made regarding another example of a specific configuration of the external I/F unit 114 wherein consideration of dark region and bright region can be manually adjusted will be described with reference to FIG. 19.

The external I/F unit 114 shown in FIG. 19 is configured so as to easily adjust consideration of dark regions and bright regions with a one-button arrangement.

This external I/F unit 114 is an arrangement wherein a dark-region adjustment switch 705 for inputting information for giving consideration to dark regions, and a bright-region adjustment switch 706 for inputting information for giving consideration to bright regions, have been added to a configuration such as shown in FIG. 18.

Next, the operations of the external I/F unit 114 shown in FIG. 19 will be described.

The user presses the dark-region adjustment switch 705 once in the event of desiring to give consideration to dark regions, and presses the bright-region adjustment switch 706 once in the event of desiring to give consideration to bright regions.

The information thus inputted by the external I/F unit 114 is transferred to the exposure control unit 502 via the control unit 113, and correction of a predetermined amount is preformed at the exposure control unit 502.

Note that while an arrangement is made here wherein adjustment is made in a simple manner by pressing the dark-region adjustment switch 705 or bright-region adjustment switch 706 just once, but an arrangement may be made in which, upon pressing one of the switches once, a slide bar such as shown in FIG. 18 is displayed on the liquid crystal panel 700 (by superimposed display, for example), such that pressing the dark-region adjustment switch 705 once moves the slide bar in the direction of giving consideration to the dark regions by a predetermined amount, and pressing the bright-region adjustment switch 706 once moves the slide bar in the direction of giving consideration to the bright regions by a predetermined amount. Determination is not restricted to being made by pressing the determination switch 704, and a configuration may be made in which determination is automatically made after elapsing of a predetermined amount of time following operation of the dark-region adjustment switch 705 or bright-region adjustment switch 706. Also, in a case in which determination is to be made by operation of the determination switch 704 or elapsing of a predetermined amount of time, a further preferable arrangement is for the slide bar shown in FIG. 18 to automatically disappear from the display on the liquid crystal panel 700. Employing such a configuration is advantageous in that operations are simple and yet detailed adjustment may be made.

Note that the present invention is not restricted to the above-described embodiments, and it is needless to say that various modifications and applications may be made without departing from the essence of the invention.

The above-described embodiments of the present invention which have been described in detail can yield the following configurations, operations, and advantages.

Prior to real shooting, pre-shooting is performed multiple times with different exposure amounts. Conversion properties are calculated with respect to the signals that correspond to the image signals acquired in the pre-shooting, which are to be used in gradation conversion processing. The exposure amount, which is to be used in the real shooting, is determined based upon the signals that correspond to the image signals, the exposure amounts, and the conversion properties. The real shooting is performed with the exposure amount thus determined. The image signal acquired by the real shooting is subjected to the gradation conversion processing. As described above, the exposure condition is obtained so as to obtain the maximum effective dynamic range based upon the conversion properties which have been obtained as a result of the pre-shooting and which are to be used in the gradation conversion processing. Accordingly, the dynamic range of the entire signal can be appropriately acquired, thereby providing a high-quality image signal.

Prior to real shooting, pre-shooting is performed multiple times with different exposure amounts. The luminance signal is extracted for each of the image signals acquired in the pre-shooting, and the conversion properties are calculated which are used in the gradation conversion processing. The exposure amount, which is to be used in the real shooting, is determined based upon the respective luminance signals, the exposure amounts, and the conversion properties. Then, the real shooting is performed with the exposure amount thus determined. The luminance signal is extracted from the image signal thus acquired in the real shooting, and the gradation conversion processing is performed for the luminance signal thus extracted. Such an arrangement can be applied to a color image signal. This improves the compatibility with conventional camera systems. Thus, such an arrangement can be applied to various kinds of image pickup systems.

The difference between the exposure amounts used in the pre-shooting is set based upon the dynamic range of the image pickup device. With such an arrangement, the signals are acquired in the pre-shooting with reduced redundancy. Such an arrangement allows a wide dynamic range to be covered with a reduced number of images acquired in the pre-shooting, thereby improving the processing speed of the processing up to the determination of the exposure amount.

The reduced-size signal is divided into multiple regions, and a gradation conversion curve is calculated for each region. Gradation conversion processing is performed on the signal value of each target pixel in the reduced-size signal based upon the multiple gradation conversion curves with respect to the multiple regions. Then, interpolation computation is performed based upon the multiple signal values thus subjected to the gradation conversion so as to calculate the signal value of the corresponding target pixel subjected to the gradation conversion processing. The conversion properties with respect to the gradation conversion processing are calculated based upon the signal values prior to the gradation conversion processing and the signal values subjected to the gradation conversion processing. The conversion properties thus obtained is enlarged, thereby calculating the conversion properties for the original size signal. With such an arrangement, the same space-variant gradation conversion properties as those in the real shooting are obtained with respect to the signals that correspond to the image signals acquired in the pre-shooting, thereby improving the precision of the exposure amount setting in the real shooting. Also, the gradation conversion properties are calculated for the signal obtained by reducing the signal that corresponds to the image signal, thereby providing high-speed processing.

Each of the relation between the number of ineffective pixels in the dark region and the exposure amount and the relation between the number of ineffective pixels in the bright region and the exposure amount is represented by a model in the form of a function. The exposure amount to be used in the real shooting is set such that the number of ineffective pixels in the dark region and the bright region exhibits the minimum value based upon the models. As described above, the exposure amount is set such that the number of ineffective pixels in the dark region and the bright region exhibits the minimum value. Accordingly, such an arrangement effectively utilizes the overall dynamic range of the entire signal, so subjectively preferable image signals can be obtained. Also, the exposure amount is automatically set, thereby providing a camera system with improved operability.

The relation between the number of ineffective pixels in the dark region and the exposure amount is represented by a model in the form of a function giving consideration to the space-variant gradation conversion processing and the noise properties. As described above, the change in the number of the ineffective pixels in the dark region is represented by a model giving consideration to the gradation conversion processing and the noise properties. This improves the precision of the calculation of the exposure amount to be used in the real shooting, thereby providing high-quality image signal.

The relation between the number of the ineffective pixels in the bright region and the exposure amount is represented by a model in the form of a function giving consideration to the space-variant gradation conversion processing and the threshold that corresponds to the reference white. As described above, the change in the ineffective pixels in the bright region is represented by a model giving consideration to the gradation conversion processing and the reference white. This improves the calculation precision for the exposure amount to be used in the real shooting, thereby providing high-quality image signal.

The relation between the number of ineffective pixels in the dark region and the exposure amount or the relation between the number of ineffective pixels in the bright region and the exposure amount is represented by a model in the form of a linear functional expression or a quadratic functional expression. An arrangement employing a linear functional expression has the advantage of reducing the number of required image to be acquired in the pre-shooting, thereby improving the processing speed. On the other hand, an arrangement employing a quadratic functional expression improves the precision of the model, thereby controlling the exposure amount with high precision.

The exposure amount to be used in the real shooting is set such that the number of the ineffective pixels in the dark region matches the number of the ineffective pixels in the bright region. Such an arrangement provides shooting with improved balance between the dark region and the bright region, which appropriately acquires the overall dynamic range of the entire signal.

Correction is performed for at least one of the relation between the number of ineffective pixels in the dark region and the exposure amount and the relation between the number of ineffective pixels in the bright region and the exposure amount. With such an arrangement, which of the bright region and dark position is to be given prior consideration to is adjusted, thereby improving the degree of freedom of shooting.

The correction is performed for the relation between the number of the ineffective pixels in the dark region and the exposure amount based upon the ISO sensitivity information. With such an arrangement, the noise effect involved in the shooting with high ISO sensitivity is reduced, so subjectively preferable image signals can be obtained. Furthermore, the correction is automatically performed, thereby improving the operability of the camera system.

Correction is performed for the relation between the number of the ineffective pixels in the bright region and the exposure amount based upon the information with respect to the area of the high-luminance region. With such an arrangement, the relation between the number of the ineffective pixels in the bright region and the exposure amount is corrected based upon the information with respect to the area of the high-luminance region, and accordingly, the effect of whiteout in the high-luminance region is reduced, so subjectively preferable image signals can be obtained. Furthermore, the correction is automatically performed, thereby improving the operability of the camera system.

The shooting situation is comprehensively estimated based upon the focus information and the exposure control information. Then, correction is performed for at least one of the relation between the number of the ineffective pixels in the dark region and the exposure amount and the relation between the number of the ineffective pixels in the bright region and the exposure amount, based upon the shooting situation thus estimated. With such an arrangement, which of the bright region and dark position is to be given prior consideration to is adjusted, thereby providing a high-quality image signal utilizing the overall dynamic range of the image signal. Furthermore, the adjustment is automatically performed, thereby improving the operability of the camera system.

Correction is performed for at least one of the relation between the number of the ineffective pixels in the dark region and the exposure amount and the relation between the number of the ineffective pixels in the bright region and the exposure amount, based upon the adjustment values set by the user. As described above, which of the bright region and dark position is to be given prior consideration to is adjusted based on the value adjusted by the user, so subjectively preferable image signals can be obtained according to the user's purpose.

The signal is reduced, and is divided into multiple regions. Then, a gradation conversion curve is calculated for each region. The gradation conversion is performed using the gradation conversion curves provided in increments of regions. Furthermore, interpolation computation is performs so as to calculate the signal values subjected to the gradation conversion processing in increments of pixels. The conversion properties with respect to the gradation conversion processing are calculated based upon the signal values prior to the gradation conversion processing and the signal values subjected to the gradation conversion processing. The conversion properties thus obtained are enlarged so as to calculate the conversion properties for the original size signal, and the gradation conversion processing is performed. As described above, space-variant gradation conversion processing is performed, whereby high-quality image signals can be obtained, effectively utilizing the overall dynamic range including not only the main subject but also the background. Furthermore, the calculation of the gradation conversion curves is performed based upon the signal obtained by reducing the signal that corresponds to the image signal, thereby improving the processing speed. Moreover, the gradation conversion curve is converted into a form provided in increments of pixels by performing interpolation computation. Such an arrangement ensures the continuity between the adjacent regions, thereby providing high-quality image signal.

The gradation conversion curve is calculated using a cumulative histogram. The calculation of the gradation conversion curve based upon the cumulative histogram provides a high-quality image signal effectively utilizing the overall dynamic range of a scene from the dark region up to the bright region.

A single image pickup device with a Bayer-type primary color filter or a color-difference line-sequential complementary color filter arranged on the front face thereof is employed. Such an arrangement is highly compatible with conventional shooting units. Thus, such an arrangement can be applied to wide variety of image pickup systems.

The invention claimed is:

1. A camera system, which performs an exposure amount control operation in combination with gradation conversion processing for an image signal acquired from an image pickup device, comprising:
   a pre-shooting control unit which performs a first control operation so as to perform pre-shooting multiple times with different exposure amounts prior to a real shooting;
   a conversion property calculation unit which calculates first conversion properties with respect to signals that correspond to image signals acquired in the pre-shooting, which are to be used in the gradation conversion processing;
   an exposure control unit which determines an exposure amount used in the real shooting based upon the signals that correspond to the image signals acquired in the pre-shooting, exposure amounts used in the pre-shooting, and the first conversion properties, the exposure control unit comprising:
      a dark-region ineffective pixel estimation unit which estimates a relation between a number of ineffective pixels in a dark region and the exposure amount based upon the signal that corresponds to the image signal obtained in the real shooting, the exposure amounts used in the pre-shooting, and the first conversion properties;
      a bright-region ineffective pixel estimation unit which estimates the relation between a number of ineffective pixels in a bright region and the exposure amount based upon the signal that corresponds to the image signal obtained in the real shooting, the exposure amounts used in the pre-shooting, and the first conversion properties; and
      an exposure amount calculation unit which calculates the exposure amount for the real shooting based upon the relation between the number of the ineffective pixels in the dark region and the exposure amount and the relation between the number of the ineffective pixels in the bright region and the exposure amount;
   a real shooting control unit which performs a second control operation so as to perform the real shooting based upon the determined exposure amount; and
   a gradation conversion unit which calculates second conversion properties with respect to a signal that corresponds to an image signal obtained in the real shooting, which are to be used in the gradation conversion processing, and performs the gradation conversion processing.

2. The camera system according to claim 1, wherein the image pickup device is a monochrome image pickup device, and wherein the signal that corresponds to the image signal is the image signal itself.

3. The camera system according to claim 1, wherein the image pickup device is a color image pickup device, and wherein the camera system further comprises:
   a first Y/C separation unit which extracts a first luminance signal from each image signal acquired in the pre-shooting, and wherein the signal that corresponds to the image signal acquired in the pre-shooting is the first luminance signal;
   a second Y/C separation unit which extracts a second luminance signal from the image signal obtained in the real shooting, and wherein the signal that corresponds to the image signal obtained in the real shooting is the second luminance signal.

4. The camera system according to claim 1, wherein the pre-shooting control unit sets a change in the exposure amount based upon the dynamic range of the image pickup device.

5. The camera system according to claim 1, wherein the conversion property calculation unit includes:
   a reducing unit which obtains a reduced-size signal by converting each signal that corresponds to the respective image signal acquired in the pre-shooting at a predetermined reduction ratio;
   a dividing unit which divides the reduced-size signal into multiple regions;
   a gradation conversion curve calculation unit which calculates a gradation conversion curve for each region based upon luminance distribution information;
   an interpolation calculation unit which performs gradation conversion processing on a signal value of each target pixel in the reduced-size signal based upon the multiple gradation conversion curves which correspond to the respective multiple regions, and performs interpolation computation using a plurality of signal values thus subjected to the gradation conversion processing, thereby calculating the signal value of each target pixel subjected to gradation conversion processing;
   a gain calculation unit which calculates third conversion properties based upon the reduced-size signal and the plurality of signal values thus subjected to the gradation conversion processing, which are to be used in the gradation conversion processing; and
   an enlarging unit which converts the third conversion properties at a predetermined enlargement ratio, which are to be used in the gradation conversion processing.

6. The camera system according to claim 1, wherein the dark-region ineffective pixel estimation unit includes:
   a noise estimation unit which estimates noise amount in increments of pixels or predetermined regions based upon the signal that corresponds to the image signal obtained in the real shooting;
   a gain correction unit which corrects the noise amount and the signal that corresponds to the image signal obtained in the real shooting based upon the second conversion properties;
   a noise range setting unit which sets a noise range based upon the corrected noise amount;
   a dark-region ineffective pixel ratio calculation unit which calculates a ratio of corrected signals that correspond to image signals that are within the noise range, as a dark-region ineffective pixel ratio; and
   a function approximation unit which approximates the relation between the exposure amounts used in the pre-shooting and the dark-region ineffective pixel ratio by a predetermined function.

7. The camera system according to claim 1, wherein the bright-region ineffective pixel estimation unit includes:
   a threshold setting unit which sets a predetermined threshold for the signal that corresponds to the image signal obtained in the real shooting;

a gain correction unit which corrects the signal that corresponds to the image signal obtained in the real shooting, based upon the second conversion properties;

a bright-region ineffective ratio calculation unit which calculates a ratio of corrected signals that correspond to image signals that are greater than the threshold, as the bright-region ineffective ratio; and a function approximation unit which approximates the relation between the exposure amounts used in the pre-shooting and the bright-region ineffective pixel ratio by a predetermined function.

8. The camera system according to claim 6, wherein the function approximation unit employs a linear functional expression or a quadratic functional expression as the predetermined function.

9. The camera system according to claim 7, wherein the function approximation unit employs a linear functional expression or a quadratic functional expression as the predetermined function.

10. The camera system according to claim 1, wherein the exposure amount calculation unit includes a search unit which searches for the exposure amount such that the number of the ineffective pixels in the dark region is equal to the number of the ineffective pixels in the bright region.

11. The camera system according to claim 10, wherein the exposure amount calculation unit further includes an image quality adjustment unit which corrects at least one of the relation between the number of the ineffective pixels in the dark region and the exposure amount and the relation between the number of the ineffective pixels in the bright region and the exposure amount.

12. The camera system according to claim 11, wherein the image quality adjustment unit includes a high-sensitivity region adjustment unit which corrects the relation between the number of the ineffective pixels in the dark region and the exposure amount based upon ISO sensitivity information obtained from the exposure amount used in the pre-shooting.

13. The camera system according to claim 11, wherein the image quality adjustment unit includes a high-luminance region adjustment unit which corrects the relation between the number of the ineffective pixels in the bright region and the exposure amount based upon the information with respect to the area of the high-luminance region obtained from the signal that corresponds to the image signal.

14. The camera system according to claim 11, wherein the image quality adjustment unit includes:

a shooting situation estimation unit which estimates a shooting situation based upon the focus information and the exposure information in the pre-shooting; and a shooting situation adjustment unit which corrects, based upon the shooting situation, at least one of the relation between the number of the ineffective pixels in the dark region and the exposure amount and the relation between the number of the ineffective pixels in the bright region and the exposure amount.

15. The camera system according to claim 11, wherein the image quality adjustment unit includes:

an interface unit which allows a user to input an adjustment value; and a manual adjustment unit which corrects, based upon the adjustment value inputted by the user, at least one of the relation between the number of the ineffective pixels in the dark region and the exposure amount and the relation between the number of the ineffective pixels in the bright region and the exposure amount.

16. The camera system according to claim 1, wherein the conversion property calculation unit includes:

a reducing unit which converts the signal that corresponds to the image signal at a predetermined reduction ratio, thereby obtaining a reduced-size signal;

a dividing unit which divides the reduced-size signal into a plurality of regions;

a gradation conversion curve calculation unit which calculates a gradation conversion curve for each region based upon luminance distribution information;

an interpolation calculation unit which performs gradation conversion processing of a signal value of each target pixel in the reduced-size signal based upon a plurality of the gradation conversion curves that correspond to the plurality of regions, and performs interpolation computation processing based upon the plurality of signal values thus subjected to the gradation conversion processing, thereby calculating the signal value of the each target pixel subjected to the gradation conversion processing;

a gain calculation unit which calculates third conversion properties based upon the reduced-size signal and the plurality of signal values thus subjected to the gradation conversion processing, which are to be used in the gradation conversion processing;

an enlarging unit which converts the third conversion properties at a predetermined enlargement ratio, which are to be used in the gradation conversion processing; and a conversion processing unit which performs the gradation conversion processing on the signal that corresponds to the image signal obtained in the real shooting, based upon the conversion properties.

17. The camera system according to claim 5, wherein the gradation conversion curve calculation unit employs a cumulative histogram as the luminance distribution information.

18. The camera system according to claim 16, wherein the gradation conversion curve calculation unit employs a cumulative histogram as the luminance distribution information.

19. The camera system according to claim 3, wherein the color image pickup device is a single color image pickup device including a Bayer-type RGB (Red, Green, and Blue) primary color filter or a Cy-Mg-Ye-G (cyan, magenta, yellow, and green) color-difference line-sequential complementary color filter mounted on the front face thereof.

* * * * *